United States Patent
Kawai et al.

(10) Patent No.: US 6,177,776 B1
(45) Date of Patent: Jan. 23, 2001

(54) APPARATUS FOR RECOGNIZING THE LANDED STATE OF FOOT OF LEGGED MOVING ROBOT

(75) Inventors: Takayuki Kawai; Toru Takenaka; Tadaaki Hasegawa; Takashi Matsumoto, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/100,682

(22) Filed: Jun. 19, 1998

(30) Foreign Application Priority Data

Jun. 20, 1997 (JP) .................................................. 9-164541

(51) Int. Cl.$^7$ .................................................. B62D 57/032
(52) U.S. Cl. .................... 318/568.12; 700/245; 700/252; 901/1; 901/9; 180/8.1
(58) Field of Search .......................... 318/568.12, 568.2, 318/568.22; 701/11, 23; 702/150, 151, 152, 153, 154, 155; 700/245, 252, 253, 254; 901/1, 2, 3, 4, 5, 6, 7, 8, 9, 10; 180/8.1, 8.2, 8.5

(56) References Cited

U.S. PATENT DOCUMENTS

| | | | |
|---|---|---|---|
| 5,255,753 | 10/1993 | Nishikawa et al. | 180/8.6 |
| 5,416,393 * | 5/1995 | Gomi et al. | 318/568.2 |
| 5,432,417 * | 7/1995 | Takenaka et al. | 318/568.12 |
| 5,737,217 * | 4/1998 | Nishikawa et al. | 364/167.01 |
| 5,838,130 * | 11/1998 | Ozawa | 318/568.2 |
| 5,841,258 * | 11/1998 | Takenaka | 318/568.12 |
| 5,872,893 * | 2/1999 | Takenaka et al. | 395/80 |
| 5,929,585 * | 7/1999 | Fujita | 318/568.2 |
| 5,936,367 * | 8/1999 | Takenaka | 318/568.12 |
| 5,974,366 * | 10/1999 | Kawai et al. | 702/150 |
| 6,021,363 * | 2/2000 | Nishikawa et al. | 700/253 |

* cited by examiner

Primary Examiner—Glenn A. Auve
Assistant Examiner—Tim Vo
(74) Attorney, Agent, or Firm—Lyon & Lyon LLP

(57) ABSTRACT

A legged moving robot has a plurality of movable legs for repeatedly touching and leaving a floor. A force sensor is mounted on each of the movable legs at a position spaced from a foot sole thereof toward a proximal end thereof, and detects at least a force and a moment based on a reactive force applied from the floor to the foot when the foot is landed on the floor. The foot is tilted along a ridge on the floor by actuators when the foot is landed on the ridge such as the edge of a stair. A position of the center of the reactive force applied from the floor to the foot is recognized on the basis of the force and the moment detected by the force sensor, in a plurality of tilted attitudes of the foot when the foot is tilted. A landed direction and/or a landed position of the foot with respect to the ridge is recognized on the basis of the position of the center of the reactive force recognized in the plurality of tilted attitudes of the foot.

42 Claims, 14 Drawing Sheets

APPARATUS FOR RECOGNIZING THE LANDED STATE OF FOOT OF LEGGED MOVING ROBOT

BACKGROUND OF THE INVENTION

1. Field of the Invention

The present invention relates to a legged moving robot, and more particularly to an apparatus for recognizing the direction and position in which the foot of a movable leg of a legged moving robot is landed on a floor ridge, such as an edge of a stair or the like, with respect to the floor ridge.

2. Description of the Prior Art

When a legged moving robot such as a two-legged (biped) locomotion robot moves up or down a stair or on a rough surface, it is desirable to recognize the direction and position in which the foot of a movable leg of the legged moving robot is landed on a floor ridge, such as an edge of a stair or an upper surface of a floor convex, with respect to the floor ridge.

Specifically, when a biped locomotion robot ascends a stair with a certain gait (a walking pattern such as a stride), if the foot of one movable leg of the robot is landed on an edge of a stair step near the toe when the foot is to touch the stair step, then the foot of the other movable leg may possibly miss an upper stair step with the present gait when the other movable leg attempts to reach the upper stair step. Therefore, it is necessary to correct the gait of the robot, e.g., increase the stride.

Similarly, when the biped locomotion robot descends a stair with a certain gait, if the foot of one movable leg of the robot is landed on an edge of a stair step near the heel when the foot is to leave the stir step, then the foot of the movable leg may possibly miss a lower stair step with the present gait when the movable leg attempts to reach the lower stair step. Therefore, it is necessary to correct the gait of the robot, e.g., reduce the stride.

Furthermore, when a foot of a biped locomotion robot is landed on an edge of a stair while being oriented obliquely to the edge of t he stair upon ascent or descent along the stair, the robot tends to move obliquely up or down the stair with the present gait. Since the robot would otherwise possibly hit a lateral wall of the stair or the foot would otherwise possibly miss the stair, it is necessary to correct the direction in which to advance the feet of the robot.

For correcting the gait of the robot, it is desirable to recognize the direction and position in which the foot of the robot is landed on a floor ridge such as an edge of a stair, or the direction and position of a floor ridge with respect to the foot, when th e foot is landed on the floor ridge in line-to-line contact therewith.

One prior arrangement for recognizing the direction and position in which the foot of a robot is landed on an edge of a stair when the robot moves up or down the stair is disclosed in U.S. Pat. No. 5,737,217, for example.

According to the disclosed arrangement, a tape for reflecting light is applied to a stair step parallel to an edge thereof, and a plurality of light sensors that are longitudinal spaced are disposed on each of opposite sides of each of the robot feet. When a foot of the robot is landed on the stair step, the position and direction of the edge of the stair step with respect to the foot are recognized on the basis of which light sensor has detected the tape (those light sensors which are not positioned on the stair step do not detect the tape).

The tape applied to the stair step may comprise a metal sheet, and each of the light sensors on the robot feet may comprise an eddy-current proximity sensor. It is possible to recognize the position and direction of the edge of the stair step with respect to the foot by detecting the tape with the eddy-current proximity sensors.

However, since the tape needs to be applied to each of the stair steps, the robot is subject to limitations on ranges in which it can operate, and the overall system is relatively expensive. Furthermore, the light sensors tend to suffer erroneous detections due to smearing of the sensors or tapes and dirt attached to the sensors or tapes. As a result, it may often be impossible to properly recognize the position and direction of a stair edge with respect to the robot foot. Robots with eddy-current proximity sensors mounted on their feet are subject to limitations on ranges in which they can operate because these robots cannot walk on metallic stairs.

U.S. Pat. No. 5,255,753 discloses a robot having a distributed contact sensor which comprises a matrix of contact sensor elements mounted on each of the foot soles of a robot. The position and shape of a contact area on a foot sole of the robot can be detected from output data of the contact sensor elements. When a foot of the robot is landed on a stair step, the position and shape of a boundary between an area of the foot sole which is in contact with the stair step and an area of the foot sole which is out of contact with the stair step are recognized on the basis of output data of the contact sensor elements, for thereby recognizing the position and direction of the foot with respect to an edge of the stair step.

However, since the distributed contact sensor is mounted on the foot sole, the contact sensor is liable to be damaged due to impacts acting on the foot sole when the foot sole touches a floor during movement of the robot. If the contact sensor is covered with an elastic material such as rubber for protection against damage, then the contact sensor is unable to accurately detect the position and shape of a contact area of the foot sole. Furthermore, since many contact sensor elements are employed, a lot of processing operation is needed to process the output signals from the contact sensor elements.

SUMMARY OF THE INVENTION

It is therefore an object of the present invention to provide an apparatus for reliably and appropriately recognizing the direction and position in which the foot of a movable leg of a legged moving robot is landed on a floor ridge, such as an edge of a stair or the like, with respect to the floor ridge, in a variety of ranges in which the robot can operate, without damage to a sensor, with a relatively simple structure, and through a relatively simple processing operation.

To achieve the above object, there is provided an apparatus for recognizing a landed state of a foot of a legged moving robot having a plurality of movable legs for repeatedly touching and leaving a floor, comprising a force sensor mounted on each of the movable legs at a position spaced from a foot sole thereof toward a proximal end thereof, for detecting at least a force and a moment based on a reactive force applied from the floor to the foot when the foot is landed on the floor, foot tilting means for tilting the foot along a ridge on the floor when the foot is landed on the ridge, reactive force center recognizing means for recognizing a position of the center of the reactive force applied from the floor to the foot based on the force and the moment detected by the force sensor, in a plurality of tilted attitudes of the foot when the foot is tilted by the foot tilting means, and landed direction/position recognizing means for recognizing a landed direction and/or a landed position of the foot with respect to the ridge based on the position of the center of the reactive force recognized by the reactive force center recognizing means in the plurality of tilted attitudes of the foot.

The position on the foot sole of the center of the reactive force applied from the floor to the foot is a position where the reactive force is dynamically regarded as being concentrated. The position of the center of the reactive force can be determined through dynamic calculations from the force and moment exerted in a certain direction by the reactive force and detected by the force sensor. Specifically, the position of the center of the reactive force is determined as a point where moments other than a moment about an axis perpendicular to the foot sole are "0".

When the foot is landed on the ridge on the floor (at this time, the foot sole and the ridge are held in line-to-line contact with each other), the center of the reactive force exists on the line of contact between the foot sole and the ridge. When the foot is tilted along the ridge by the foot tilting means, the position of the center of the reactive force moves on the line of contact along the ridge, and the trajectory of the position represents the direction and position of the line of contact on the foot sole, and hence the direction and position of the ridge.

Therefore, when the reactive force center recognizing means recognizes the position of the center of the reactive force based on the force and the moment detected by the force sensor, in the tilted attitudes of the foot when the foot is tilted by the foot tilting means, the landed direction/position recognizing means recognizes the landed direction and/or the landed position of the foot with respect to the ridge based on the recognized position of the center of the reactive force in the tilted attitudes of the foot.

Since the position of the center of the reactive force required to recognize the landed direction and/or the landed position of the foot is determined on the basis of the force and the moment detected by the force sensor, it is not adversely affected by dirt from the floor. Furthermore, inasmuch as the force sensor is spaced from the foot sole and will not contact the floor directly, the force sensor is protected against damage due to impacts when the foot is landed on the floor. If the force in one direction and the moment about at most two axes are detected by the force sensor, as described later on, then the position of the center of the reactive force can be determined from the detected force and moment, so that no complex calculations will be required. The force sensor may comprise a known six-axis force sensor. The foot may be tilted by actuating joint mechanisms of each of the movable legs of the robot.

Therefore, the landed direction and position of the foot with respect to the ridge, such as an edge of a stair, at the time the foot is landed on the ridge can reliably be recognized through a simple arrangement by way of simple calculations without damage to the force sensor, in a variety of environments in which the robot operates.

The landed direction and/or the landed position of the foot can be recognized irrespective of whether the ridge extends substantially transversely or longitudinally of the foot. Practically, however, it is important for robot motion control that the landed direction and/or the landed position of the foot with respect to the ridge be detected in the case where the ridge extends substantially transversely of t he foot, such as an edge of a stair which the robot ascends or descends.

According to a first aspect of the present invention, the ridge extends substantially transversely of the foot, the foot tilting means comprising means for tilting the foot along the ridge into a right-hand tilted attitude in which a right-hand side edge of the foot is held in substantially point-to-point contact with the ridge and a left-hand tilted attitude in which a left-hand side edge of the foot is held in substantially point-to-point contact with the ridge, the reactive force center recognizing means comprising means for recognizing the position, in a longitudinal direction of the foot, of the center of the reactive force in each of the right-hand tilted attitude and the left-hand tilted attitude of the foot, based on the force and the moment detected by the force sensor, and the landed direction/position recognizing means comprising means for recognizing the landed direction and/or the landed position of the foot with respect to the ridge based on the position, in the longitudinal direction of the foot, of the center of the reactive force recognized by the reactive force center recognizing means in each of the right-hand tilted attitude and the left-hand tilted attitude of the foot.

When the foot is tilted by the foot tilting means into the right-hand tilted attitude in which the right-hand side edge of the foot is held in substantially point-to-point contact with the ridge and the left-hand tilted attitude in which the left-hand side edge of the foot is held in substantially point-to-point contact with the ridge, the position, in the longitudinal direction of the foot, of the center of the reactive force recognized by the reactive force center recognizing means in each of the right-hand tilted attitude and the left-hand tilted attitude of the foot represents the position, in the longitudinal direction of the foot, of a point of contact between the right-hand side edge of the foot with the ridge and the position, in the longitudinal direction of the foot, of a point of contact between the left-hand side edge of the foot with the ridge. These two points of contact are present on the right- and left-hand side edges of the foot, the positions of these points of contact in the transverse direction of the foot are governed by the size and shape of the foot.

Consequently, when the position, in the longitudinal direction of the foot, of the center of the reactive force are recognized by the reactive force center recognizing means in each of the right-hand tilted attitude and the left-hand tilted attitude of the foot, the positions (two-dimensional positions) on the foot sole of the points of contact between the right- and left-hand side edges of the foot and the ridge are determined. Since a line of contact between the foot sole and the ridge at the time the foot is landed on the ridge is the same as a line interconnecting the two points of contact, the landed direction and/or the landed position of the foot with respect to the ridge can be recognized on the basis of the positional relationship between those points of contact.

More specifically, with respect to the recognition of the landed direction, the landed direction/position recognizing means comprises means for calculating an azimuthal angle of the foot with respect to the ridge based on the position, in the longitudinal direction of the foot, of the center of the relative force recognized by the reactive force center recognizing means in each of the right-hand tilted attitude and the left-hand tilted attitude of the foot and a distance between the right- and left-hand side edges of the foot, and recognizing the landed direction of the foot with respect to the ridge based on the calculated azimuthal angle.

With respect to the recognition of the landed position, the landed direction/position recognizing means comprises means for calculating a distance, in the longitudinal direction of the foot, from a predetermined reference point on the foot to the ridge based on the position, in the longitudinal direction of the foot, of the center of the reactive force recognized by the reactive force center recognizing means in each of the right-hand tilted attitude and the left-hand tilted attitude of the foot and distances from the reference point to the right- and left-hand side edges of the foot, and recognizing the landed direction of the foot with respect to the ridge based on the calculated distance.

Specifically, the distance (width) between the right- and left-hand side edges of the foot represents the positional relationship (lateral distance) in the transverse direction between the two points of contact between the right- and left-hand side edges of the foot and the ridge. From this distance and the positions of the points of contact in the longitudinal direction of the foot which are recognized by the reactive force center recognizing means, the azimuthal angle of the foot with respect to a line interconnecting those points, i.e., the azimuthal angle of the foot with respect to the line, can be determined by geometrical calculations, and hence the landed direction of the foot with respect to the ridge can be determined from the azimuthal angle.

Furthermore, the distances from the reference point on the foot to the right- and left-hand side edges of the foot represent the positions of the points of contact in the transverse direction of the foot with respect to the reference point. The positions of the points of contact with respect to the reference point in the longitudinal direction of the foot are determined from the positions in the longitudinal direction of the points of contact recognized by the reactive force center recognizing means. Based on these data, therefore, the distance in the longitudinal direction of the foot from the reference point to the line interconnecting the points of contact, i.e., the distance in the longitudinal direction of the foot from the reference point to the ridge, which indicates the position of the ridge with respect to the reference point in the longitudinal direction of the foot, can be calculated through geometrical calculations. In this manner, the landed position of the foot with respect to the ridge can be recognized.

According to the first aspect of the present invention, as described above, when the position, in the longitudinal direction of the foot, of the center of the reactive force are recognized by the reactive force center recognizing means in each of the right-hand tilted attitude and the left-hand tilted attitude of the foot based on the force and the moment detected by the force sensor, the landed direction and position of the foot with respect to the ridge can be recognized through simple calculations. As a result, a process of recognizing the landed direction and position of the foot with respect to the ridge can be carried out highly simply.

In the first aspect of the present invention, the force detected by the force sensor is exerted in a direction perpendicular to the foot sole, and the moment detected by the force sensor is exerted about a transverse axis extending across the foot sole at a predetermined position thereon. By detecting the force and the moment, the position, in the longitudinal direction of the foot, of the center of the reactive force can be recognized by dynamic calculations.

In the first aspect of the present invention, the distance between the right- and left-hand side edges of the foot, and the distances from the reference point on the foot to the right- and left-hand side edges of the foot are employed in order to recognize the landed direction and position of the foot with respect to the ridge. For accurately recognizing the landed direction and position of the foot with respect to the ridge, it is necessary to bring the right- and left-hand side edges of the foot reliably into point-to-point contact with the ridge when the foot is tilted.

According to a second, more specific, aspect of the present invention, the ridge extends substantially transversely of the foot, the foot tilting means comprising means for tilting the foot along the ridge at least into a right-hand tilted attitude or a left-hand tilted attitude, the reactive force center recognizing means comprising means for recognizing the positions, in longitudinal and transverse directions of the foot, of the center of the reactive force in each of the right-hand tilted attitude and the left-hand tilted attitude of the foot, based on the force and the moment detected by the force sensor, and the landed direction/position recognizing means comprising means for recognizing the landed direction and/or the landed position of the foot with respect to the ridge based on the positions, in the longitudinal and transverse directions of the foot, of the center of the reactive force recognized by the reactive force center recognizing means in each of the right-hand tilted attitude and the left-hand tilted attitude of the foot.

In the second aspect of the present invention, the positions of the center of the reactive force in the longitudinal and transverse directions of the foot are recognized by the reactive force center recognizing means in each of the right-hand tilted attitude and the left-hand tilted attitude of the foot. Therefore, the positions (two-dimensional positions), in the longitudinal and transverse directions of the foot, on the foot sole of the two points on an initial line of contact between the foot sole and the ridge when the foot is not tilted are recognized. The line interconnecting the two points is the same as the line of contact referred to above, and the direction and position of the foot with respect to the line of contact represent the landed direction and position of the foot with respect to the ridge.

Consequently, when the position s of the center of the reactive force in the longitudinal and transverse directions of the foot are recognized in each of the right-hand tilted attitude and the left-hand tilted attitude of the foot, i.e., when the two-dimensional positions on the foot sole of the two points on the line of contact are recognized, the landed direction and/or the landed position of the sole with respect to the ridge can be recognized from the positional relationship between these points.

More specifically, with respect to the recognition of the landed direction, the landed direction/position recognizing means comprises means for calculating an azimuthal angle of the foot with respect to the ridge based on the positions, in the longitudinal and transverse directions of the foot, of the center of the reactive force recognized by the reactive force center recognizing means in each of the right-hand tilted attitude and the left-hand tilted attitude of the foot, and recognizing the landed direction of the foot with respect to the ridge based on the calculated azimuthal angle.

With respect to the recognition of the landed position, the landed direction/position recognizing means comprises means for calculating a distance, in the longitudinal direction of the foot, from a predetermined reference point on the foot to the ridge based on the positions, in the longitudinal and transverse directions of the foot, of the center of the reactive force recognized by the reactive force center recognizing means in each of the right-hand tilted attitude and the left-hand tilted attitude of the foot, and recognizing the landed position of the foot with respect to the ridge based on the calculated distance.

In the second aspect of the present invention, when the positions (two-dimensional positions) of the two points on the line of contact are recognized by the reactive force center recognizing means, the azimuthal angle of the foot with respect to a line interconnecting those points, i.e., the azimuthal angle of the foot with respect to the line, can be determined by geometrical calculations from those data, and hence the landed direction of the foot with respect to the ridge can be determined from the azimuthal angle.

Based on the recognized data of the positions of the two points on the line of contact, the distance in the longitudinal direction of the foot from the reference point to the line interconnecting the points of contact, i.e., the distance in the longitudinal direction of the foot from the reference point to the ridge can be calculated through geometrical calculations. In this manner, the landed position of the foot with respect to the ridge can be recognized.

Since the positions, in the longitudinal and transverse directions of the foot, of the center of the reactive force in the two tilted attitudes are recognized, the landed direction and the landed position of the foot with respect to the ridge can be recognized accurately. Inasmuch as the foot may be tilted to the left or the right, without the need to be tilted until the side edges thereof are held in point-to-point contact with the ridge, the robot may be controlled simply for the tilting of the foot.

In the second aspect of the present invention, the force detected by the force sensor is exerted in a direction perpendicular to the foot sole, and the moment detected by the force sensor is exerted about a transverse axis extending across the foot sole at a predetermined position thereon. By detecting the force and the moment, the position, in the longitudinal direction of the foot, of the center of the reactive force can be recognized by dynamic calculations.

According to a third, more specific, aspect of the present invention, the ridge extends substantially transversely of the foot, the foot tilting means comprising means for tilting the foot along the ridge at least to the left or the right, the reactive force center recognizing means comprising means for recognizing time-series data of the positions, in longitudinal and transverse directions of the foot, of the center of the reactive force in successive tilted attitudes while the foot is being tilted by the foot tilting means, based on the force and the moment detected by the force sensor, and the landed direction/position recognizing means comprising means for determining a function approximating a line of contact between the fact and the ridge when the foot is not tilted, based on the time-series data of the positions, in longitudinal and transverse directions of the foot, of the center of the reactive force recognized by the reactive force center recognizing means, and recognizing the landed direction and/or the landed position of the foot with respect to the ridge based on the determined function.

When the foot is tilted to the left or the right along the ridge by the foot tilting means, the time-series data of the positions, in longitudinal and transverse directions of the foot, of the center of the reactive force are recognized by the reactive force center recognizing means comprising means in successive tilted attitudes. Therefore, the positions (two-dimensional positions), in the longitudinal and transverse directions of the foot, of many points on an initial line of contact between the foot sole and the ridge when the foot is not tilted are recognized. The line interconnecting or approximating the many points is the same as the line of contact referred to above, and the direction and position of the foot with respect to the line of contact represent the landed direction and position of the foot with respect to the ridge. The line of contact passing through the above points can be expressed by a function approximating the line of contact according to a statistical process such as the method of least squares based on the positions of those points in the longitudinal and transverse directions of the foot.

Consequently, a function approximating the line of contact between the foot and the ridge when the foot is not tilted can be determined from the time-series data of the positions, in the longitudinal and transverse directions of the foot, of the center of the reactive force, which are recognized by the reactive force center recognizing means as the foot is being tilted. Based on the determined function, the direction and/or the position of the foot with respect to the line of contact, i.e., the landed direction and/or the landed position of the foot with respect to the ridge, can be recognized.

More specifically, with respect to the recognition of the landed direction, the landed direction/position recognizing means comprises means for determining an azimuthal angle of the foot with respect to the ridge according to the function, and recognizing the landed direction of the foot with respect to the ridge based on the determined azimuthal angle.

With respect to the recognition of the landed position, the landed direction/position recognizing means comprises means for determining a distance, in the longitudinal direction of the foot, from a reference point on the foot to the ridge according to the function, and recognizing the landed position of the foot with respect to the ridge based on the determined distance.

In the third aspect of the present invention, using the function approximating the line of contact, the azimuthal angle of the foot with respect to the line of contact, i.e., the azimuthal angle of the foot with respect to the ridge, can be determined, and the landed direction of the foot with respect to the ridge can be determined.

Furthermore, using the function, the distance, in the longitudinal direction of the foot, from the reference point on the foot to the line of contact, i.e., the distance, in the longitudinal direction of the foot, from the reference point on the foot to the ridge can be calculated, and the landed position of the foot with respect to the ridge can be determined.

In the third aspect of the present invention, because the function approximating the line of contact between the foot and the ridge is determined using many data of the position of the center of the reactive force at the time the foot is tilted, the landed direction and the landed position of the foot can be recognized accurately. Since many data of the position of the center of the reactive force at the time the foot is tilted are used for recognizing the landed direction and the landed position of the foot, the foot may not necessarily be tilted to both the left and the right, but may be tilted to either the left or the right. Accordingly, the robot can be controlled more simply for tilting the foot, and the foot can the tilted in a shorter period of time.

In the third aspect of the present invention, the force detected by the force sensor is exerted in a direction perpendicular to the foot sole, and the moment detected by the force sensor is exerted about transverse and longitudinal axes extending across the foot sole at predetermined positions thereon. The positions, in the longitudinal and transverse directions of the foot, of the center of the reactive force can be determined through dynamic calculations from the force and moment detected by the force sensor.

In each of the first, second, and third aspects of the present invention, the force sensor may comprise a six-axis force sensor. The six-axis force sensor is capable of detecting the force and moment which are required.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
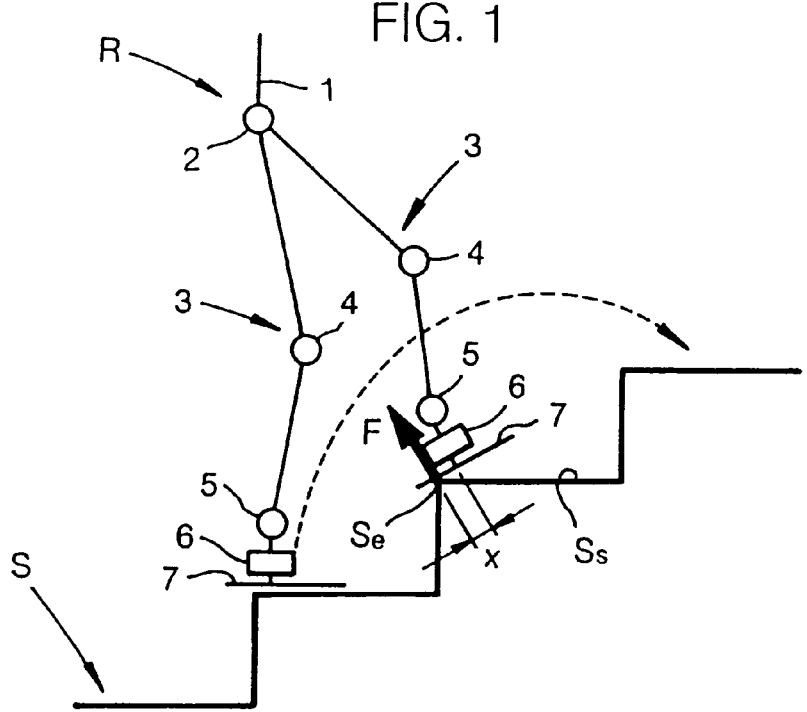
FIG. 1 is a schematic side elevational view showing the manner in which a legged moving robot ascends a stair.

A first embodiment of the present invention will be described below with reference to FIGS. 1 through 8.

A legged moving robot which incorporates an apparatus for detecting the landed state of a foot according to the present invention will first be described below with reference to FIGS. 1 through 3. The legged moving robot is commonly used in first through third embodiments of the present invention.

The legged moving robot comprises a two-legged (biped) locomotion robot R having two movable legs 3 extending from a thigh joint 2 at a lower end of a body 1. The movable legs 3, which are of an identical structure, each have a knee joint 4 in an intermediate position thereof and an ankle joint 5 in a lower position thereof. A substantially planar foot 7 is attached to a lower end of the ankle joint 5 of each of the legs 3 by a six-axis force sensor 6. The foot 7 has a foot sole 7a to which a resilient member 8 (see FIG. 3) such as of rubber is attached.

The joints 2, 4, 5 can be bent or angularly moved by actuators such as motors (not shown).

Figure 3:
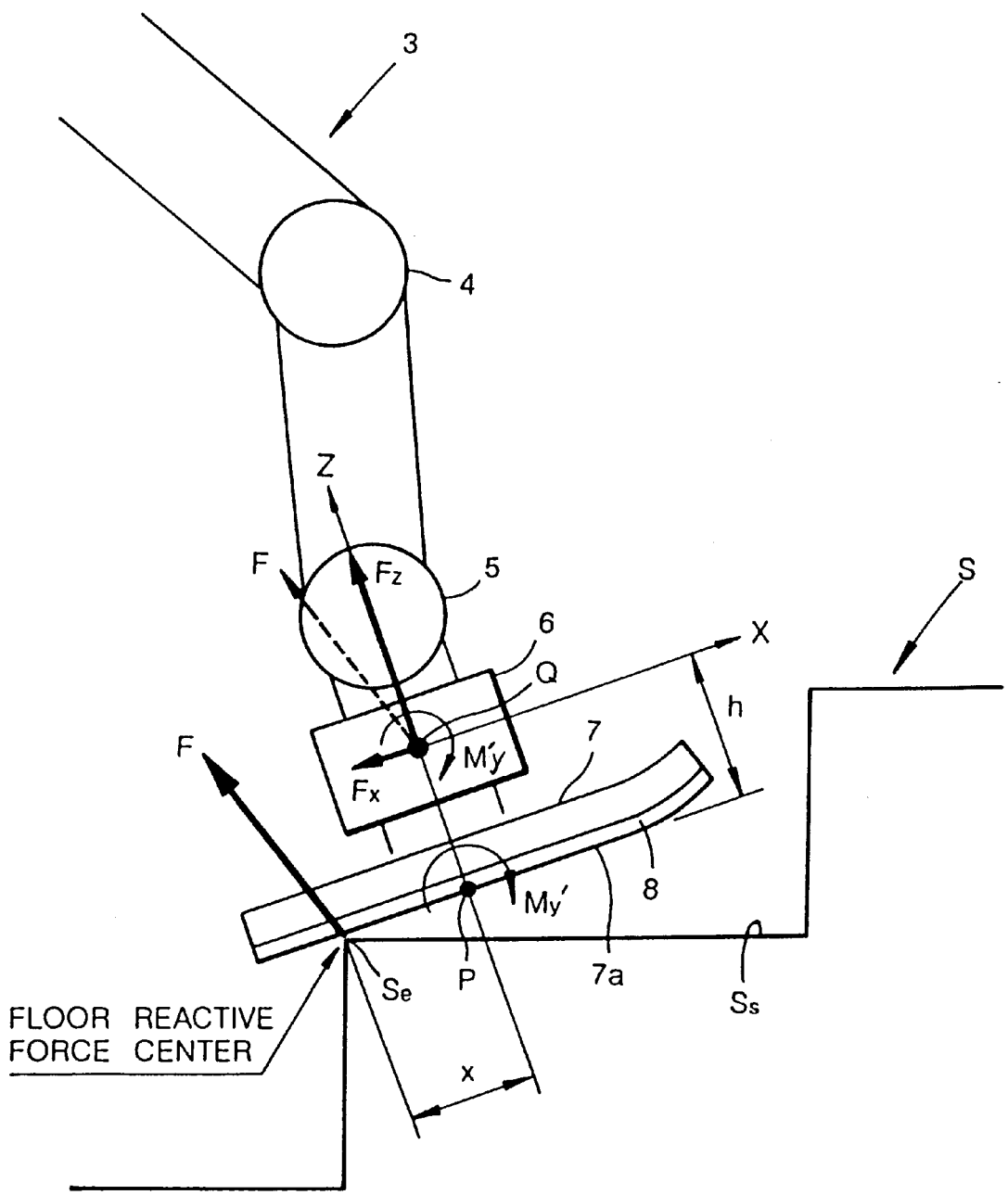
FIG. 3 is an enlarged fragmentary side elevational view of the legged moving robot as it ascends the stair.

As shown in FIG. 3, the six-axis force sensor 6, which is of a known structure, is mounted for movement in unison with the foot 7 at a position located between the ankle joint 5 and the foot 7 and spaced a distance h from the foot sole 7a toward the ankle joint 5, i.e., toward the proximal end of the movable leg 3. When the robot R moves (walks), the six-axis force sensor 6 detects force components along three axes (three spatial orthogonal coordinate axes) of a force (translational force) which is applied to a detection reference point Q of the six-axis force sensor 6 under a reactive force F from a floor (a stair step Ss or a stair step edge Se of a stair S), and also detects moments generated about those axes at the detection reference point Q under the reactive force F. The six-axis force sensor 6 produces output signals representative of the detected force components and moments.

In this embodiment, the detection reference point Q is positioned on the six-axis force sensor 6 at a location spaced the distance h from the foot sole 7a toward the ankle joint 5. As shown in FIG. 3, the six-axis force sensor 6 is associated with a spatial orthogonal coordinate system which has an X-axis extending in the longitudinal direction of the foot 7, a Y-axis (not shown) extending in the transverse direction (normal to the sheet of FIG. 3), a Z-axis perpendicularly to the foot sole 7a of the foot 7, and an origin at the detection reference point Q. The six-axis force sensor 6 produces output signals depending on respective force components Fx, Fy, Fz (only Fx, Fz shown in FIG. 3) applied respectively along the X-, Y-, Z-axes to the six-axis force sensor 6 at the detection reference point Q under the reactive force F. The six-axis force sensor 6 also produces output signals depending on respective moments Mx, My, Mz (only My shown in FIG. 3) generated respectively about the X-, Y-, Z-axes at the detection reference point Q under the reactive force F.

Figure 4:
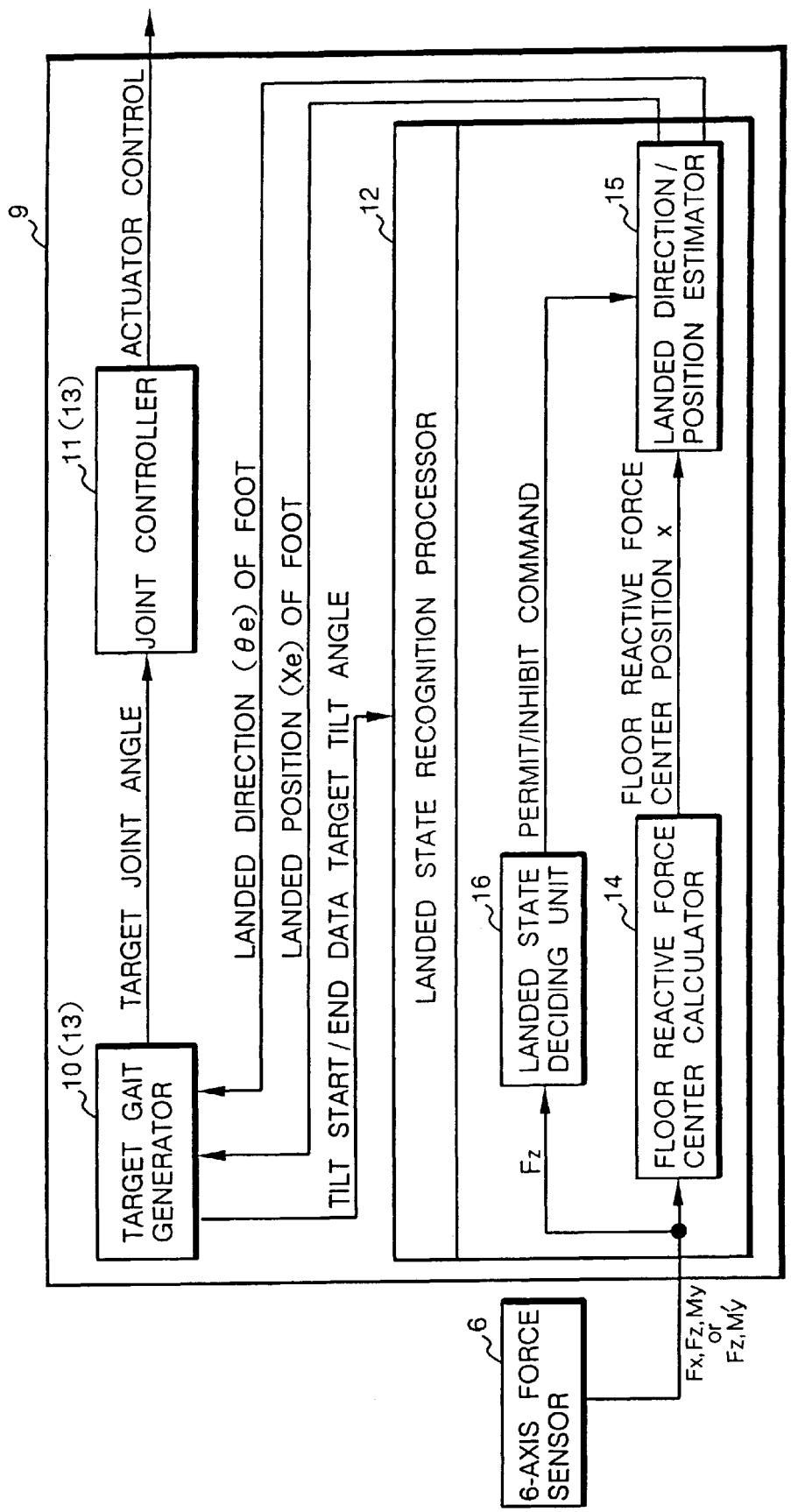
FIG. 4 is a block diagram of a controller according to a first embodiment of the present invention, which is installed on the legged moving robot shown in FIGS. 1 and 2.

As shown in FIG. 4, the robot R has a controller 9 which comprises a microcomputer for controlling the walking movement of the robot R. The controller 9 has, as its functions, a target gait generator 10 for generating a target gait, indicative of a walking pattern including a stride, a foot motion, etc., for each of the movable legs 3 and calculating target joint angles (target values for bending angles for the joints 2, 4, 5) for the joints 2, 4, 5 depending on the generated target gait, a joint controller 11 for controlling the joints 2, 4, 5 with actuators (not shown) according to the target joint angles, and a landed state recognition processor 12 for determining the direction and position in which the foot 7 of each of the movable legs 3 is landed with respect to a stair step edge Se of the stair S when the robot R moves up or down the stair S. In this embodiment, the edge Se extends substantially transversely of the feet 7.

Figure 2:
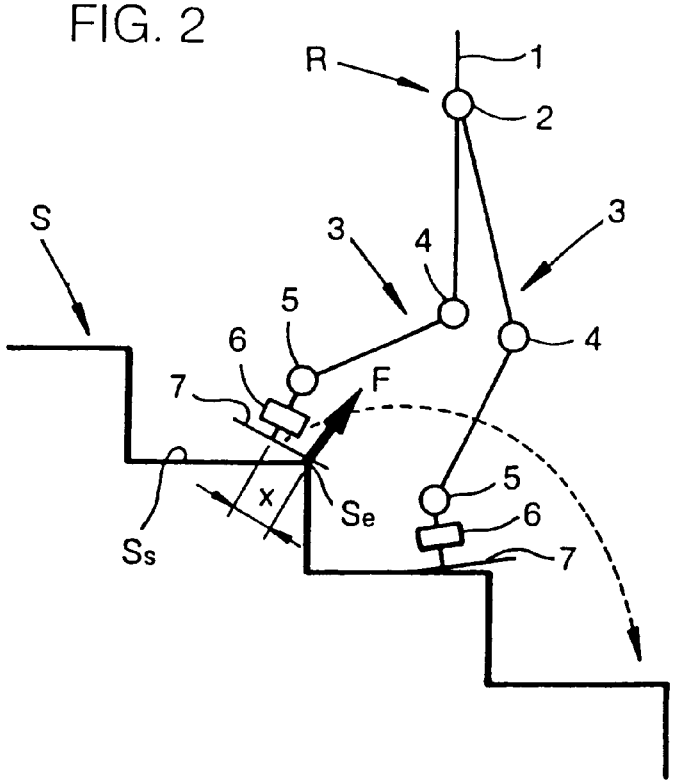
FIG. 2 is a schematic side elevational view showing the manner in which the legged moving robot descends a stair.

The target gait generator 10 basically generates a target gait for controlling each of the movable legs 3, just as a human leg, such that the foot 7 starts touching a floor from the heel, then the foot sole 7a touches the floor from the heel to the toe, and thereafter the foot 7 starts leaving the floor from the heel, and finally the toe of the foot 7 leaves the floor (see FIGS. 1 and 2).

When the robot R ascends the stair S, as shown in FIG. 1, the target gait generator 10 generates a target gait such that the heel of the foot 7 is positioned slightly off and projects beyond an edge Se of the stair S. When the robot R descends the stair S, as shown in FIG. 2, the target gait generator 10 generates a target gait such that the toe of the foot 7 is positioned slightly off and projects beyond an edge Se of the stair S. Therefore, the target gait is generated for the foot sole 7a to touch an edge Se in line-to-line contact when the foot sole 7a starts to touch the stair S upon ascending the stair S, and for the foot sole 7a to touch an edge Se in line-to-line contact when the foot sole 7a starts to leave the stair S upon descending the stair S.

Figure 5:
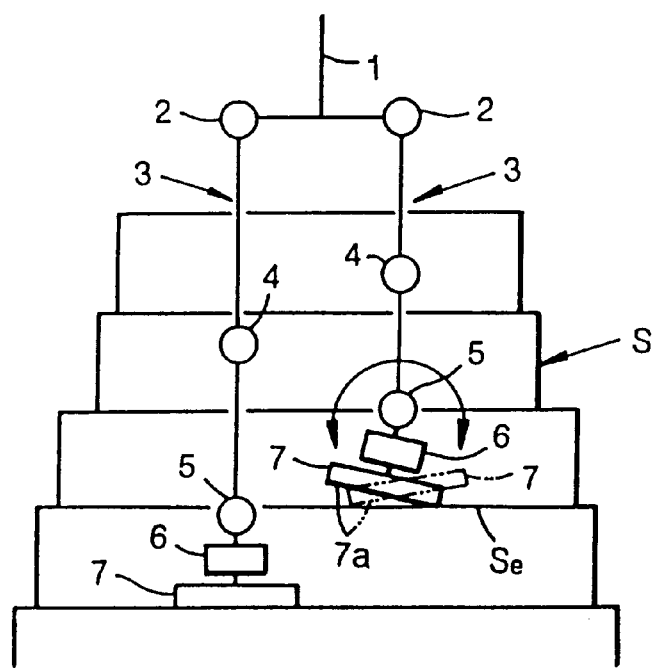
FIG. 5 is an elevational view illustrative of a process of recognizing the direction and position in which a foot of the robot is landed according to the first embodiment of the present invention.

The target gait generator 10 generates a target gait such that, each time the robot R makes a certain number of steps, e.g., 10 steps, the movement of the robot R (ascending or descending the stair S) is temporarily stopped while the foot sole 7a is touching an edge Se in line-to-line contact, i.e., when the foot 7 starts to touch the stair S upon ascending the stair S or when the foot 7 starts to leave the stair S upon descending the stair S. While the movement of the robot R is being temporarily stopped, the target gait generator 10 generates a target gait such that the foot 7 held in line-to-line contact with the edge Se of the stair S, i.e., the right-hand foot 7 as viewed in FIG. 5, is tilted a predetermined angle to the right, i.e., clockwise in FIG. 5, along the edge Se so that a right-hand side edge of the foot sole 7a will be held substantially in point-to-point contact with the edge Se, as indicated by the solid lines in FIG. 5. Then, the target gait generator 10 generates a target gait such that the foot 7 is tilted a predetermined angle to the left, i.e., counterclockwise in FIG. 5, along the edge Se so that a left-hand side edge of the foot sole 7a will be held substantially in point-to-point contact with the edge Se, as indicated by the imaginary lines in FIG. 5, and thereafter the foot 7 is returned back into line-to-line contact with the edge Se. The foot 7 may be tilted first to the left and then to the right. One of the feet 7 may be tilted first to the right and then to the left, and the other foot may be tilted first to the left and then to the right, or vice versa.

Based on the target gait thus generated, the target gait generator 10 determines target joint angles in each control cycle for the joints 2, 4, 5, and supplies the determined target joint angles to the joint controller 11.

When the foot 7 is tilted as described above, the target gait generator 10 supplies the landed state recognition processor 12 with data indicative of the start and end of the tilting of the foot 7 (hereinafter referred to as "tilt start/end data") and a target tilt angle (hereinafter referred to as "target foot tilt angle") for the foot 7 at the target gait in each control cycle.

The target gait generator 10 and the joint controller 11 jointly serve as a foot tilting means 13.

The landed state recognition processor 12 comprises a floor reactive force center calculator 14 (reactive force center recognizing means) for calculating in each control cycle a central position, on the foot sole 7a in the longitudinal direction (along the X-axis) of the foot 7, of a reactive force (hereinafter referred to as a "floor reactive force center") applied from the floor (a stair step Ss or a stair edge Se) to the foot sole 7a, from the force components Fx, Fz and the moment My detected by the six-axis force sensor 6, a landed direction/position estimator 15 (landed direction/position recognizing means) for estimating the direction and position in which the foot 7 is landed with respect to the edge Se, based on the floor reactive force center along the X-axis calculated by the floor reactive force center calculator 14 when the foot 7 is tilted as described above at the time the foot 7 is landed on the edge Se, and a landed state deciding unit 16 for deciding whether the foot 7 is landed on the edge Se in an appropriate landed state, based on the force component Fz detected by the six-axis force sensor 6, and supplying the landed direction/position estimator 15 with a permit/inhibit command indicative of whether or not the landed direction/position estimator 15 should estimate the direction and position in which the foot 7 is landed, based on the decided result.

Prior to describing the floor reactive force center calculator 14, the landed direction/position estimator 15, and the landed state deciding unit 16 in detail, the principles of a process of estimating the direction and position in which the foot 7 is landed with respect to the edge Se at the time the foot 7 is landed on the edge Se of the stair S according to the present embodiment will be described below.

The floor reactive force center will first be described below. The floor reactive force center is a central point on the foot sole 7a where reactive forces applied from a floor to the foot sole 7a when the foot 7 touches the floor are regarded as concentrated (the reactive forces are actually distributed over a region in which the foot 7 and the floor contact each other), with respect to forces (translational forces) and moments acting on the six-axis force sensor 6 due to those reactive forces from the floor. The floor reactive force center is determined as a point on the foot sole 7a where moments other than the moment about an axis perpendicular to the foot sole 7a are "0".

In FIG. 3, at the time the robot R ascends the stair S, for example, when the foot sole 7a touches the stair edge Se in line-to-line contact at the time the foot 7 starts being landed on the stair step Ss according to the above gait, the reactive force center is located on a line of contact between the foot sole 7a and the edge Se (all reactive forces applied to the foot sole 7a are distributed over the line of contact between the foot sole 7a and the edge Se). When the foot 7 thus touches the stair edge Se, as shown in FIG. 3, it is assumed that a point where the foot sole 7a crosses the Z-axis perpendicular thereto, which point is positioned directly below the detection reference point Q of the six-axis force sensor 6, is defined as a reference point P and a moment generated about an axis passing through the reference point P parallel to the Y-axis, which axis passes the reference point P perpendicularly to the sheet of FIG. 3, is represented by M'y. The moment M'y is expressed according to the following equation (1):

$$M'y = My + Fx \cdot h \qquad (1)$$

where Fx is the force component detected along the X-axis by the six-axis force sensor 6, My the moment about the Y-axis, and h the distance from the foot sole 7a to the detection reference point Q of the six-axis force sensor 6.

The force component Fx along the X-axis is positive in the direction indicated by the arrow on the X-axis in FIG. 3, i.e., the forward direction of the movable leg 3. Therefore, Fx<0 in FIG. 3. The moments M'y, My are positive in the direction indicated by the arrows in FIG. 3.

The moment M'y about the reference point P is expressed according to the following equation (2):

$$M'y = -Fz \cdot x \qquad (2)$$

where Fz is the force component detected along the Z-axis by the six-axis force sensor 6, and x the distance from the reference point P to the reactive force center of the foot sole 7a along the X-axis (longitudinal direction), (x is an X-axis coordinate of the reactive force center and x<0 in FIG. 3).

The force component Fz is positive in the direction indicated by the arrow on the Z-axis, i.e., in the upward direction.

From the equations (1), (2), the distance x is determined according to the following equation (3):

$$x = -M'y/Fz = -(My + Fx \cdot h)/Fz \quad (3)$$

The equation (3) can also be obtained when the foot sole 7a touches the edge Se in line-to-line contact at the time the foot 7 ends leaving the floor at the time the robot R descends the stair S. The equation (3) can further be obtained when the foot sole 7a is held in surface-to-surface contact with the stair step Ss, or when the foot sole 7a is tilted to the left and right so that the left-and right-hand edges of the foot sole 7a are held in point-to-point contact with the edge Se after the foot sole 7a has touched the edge Se in line-to-line contact (see FIG. 5). When the foot sole 7a touches the edge Se in line-to-line contact, the floor reactive force center coincides with a point of contact between the foot sole 7a and the edge Se.

Therefore, the position along the X-axis (in the longitudinal direction of the foot 7) of the floor reactive force center when the foot sole 7a touches the edge Se can be determined as the distance x from the reference point P along the X-axis, i.e., the X-axis coordinate of the floor reactive force center according to the above equation (3) based on the force components Fx, Fz and the moment My which are detected by the six-axis force sensor 6 at the time. If the lateral direction of the foot 7 and the direction of the edge Se agree with each other, i.e., the edge Se extends parallel to the Y-axis, when the foot 7 touches the edge Se in line-to-line contact, then the position x of the floor reactive force center is indicative of the position of the edge Se with respect to the foot 7, or stated otherwise, the position where the foot 7 is landed on the edge Se.

In this embodiment, the detection reference point Q of the six-axis force sensor 6 is established on the six-axis force sensor 6. Therefore, the position -x of the floor reactive force center along the X-axis is determined according to the equation (3). The detection reference point of the six-axis force sensor 6 may be established at the reference point P on the foot sole 7a. In this case, the moment M'y about the reference point P can directly be detected by the six-axis force sensor 6. Accordingly, the position x of the floor reactive force center can be determined from the detected value of the moment M'y and the detected value of the force component Fz along the Z-axis according to the following equation (3)':

$$x = -M'y/Fz \quad (3)'$$

In this case, the force component Fx along the X-axis is not required. The force component Fz along the Z-axis which is detected by the six-axis force sensor 6 is the same as when the detection reference point of the six-axis force sensor 6 is established at the point Q.

Therefore, the position x of the floor reactive force center along the X-axis can be determined according to the equation (3)' if the moment M'y about the reference point P on the foot sole 7a and the force component Fz along the Z-axis perpendicular to the foot sole 7a are detected. According to this embodiment in which the position x of the floor reactive force center is determined by the equation (3), the moment M'y is detected indirectly according to the equation (1) from the moment My about the detection reference point Q of the six-axis force sensor 6 and the force component Fx along the X-axis.

Figure 6:
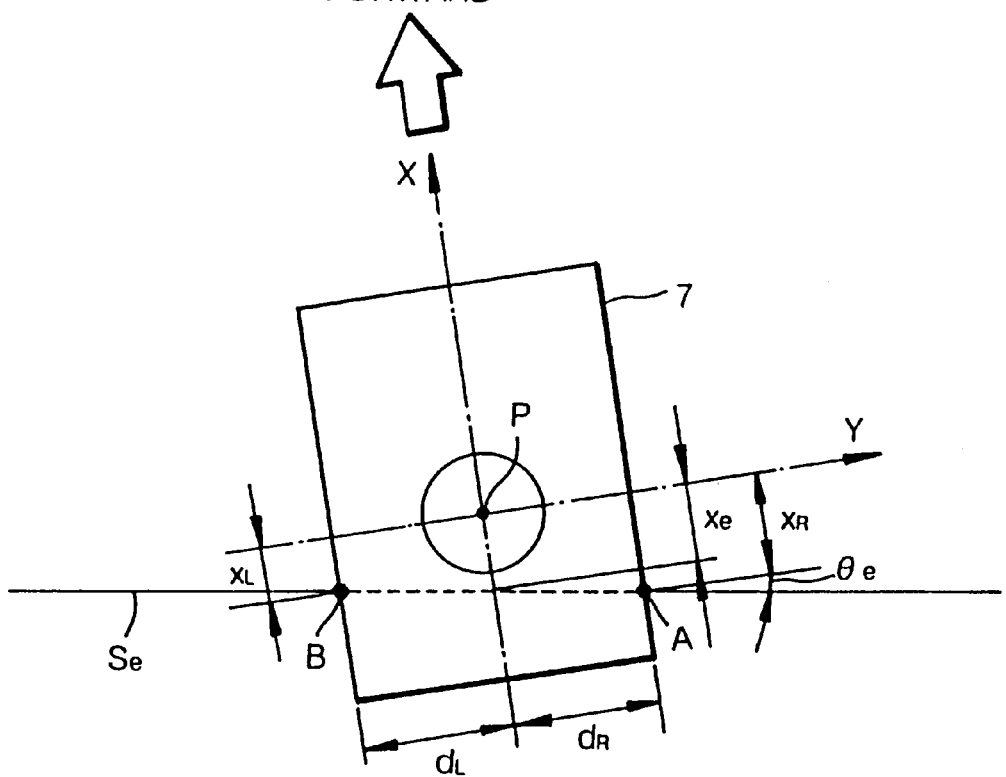
FIG. 6 is a plan view illustrative of the process of recognizing the direction and position in which the foot of the robot is landed according to the first embodiment of the present invention.

If the foot 7 is landed obliquely on the edge Se as shown in FIG. 6, then the floor reactive force center is at a point A, i.e., a point of contact between the right-hand side edge of the foot sole 7a and the edge Se, when the foot 7 is tilted to the right from the illustrated state into an attitude in which the right-hand side edge of the foot sole 7a is held in point-to-point contact with the edge Se. When the position x along the X-axis of the floor reactive force center is determined according to the equation (3) or (3)' from the output signals (detected values) of the six-axis force sensor 6 at this tilted attitude (hereinafter referred to as a "right-hand-side-edge-landed tilted attitude"), a position $x_R$ of the point A along the X-axis is determined ($x_R < 0$ in FIG. 6).

Similarly, when the foot 7 is tilted to the left from the illustrated state into an attitude in which the left-hand side edge of the foot sole 7a is held in point-to-point contact with the edge Se, the floor reactive force center is at a point B, i.e., a point of contact between the left-hand side edge of the foot sole 7a and the edge Se. When the position x along the X-axis of the floor reactive force center is determined according to the equation (3) or (3)' from the output signals (detected values) of the six-axis force sensor 6 at this tilted attitude hereinafter referred to as a "left-hand-side-edge-landed tilted attitude"), a position $x_L$ of the point B along the X-axis is determined ($x_L < 0$ in FIG. 6, $x_L > x_R$).

When the foot 7 is tilted to the right or the left, the floor reactive force center while the foot 7 is being tilted moves toward the tilted side of the foot 7 along the edge Se between the side edges of the foot sole 7a. If the position x of the floor reactive force center is determined from time to time according to the equation (3) or (3)' from the output signals (detected values) of the six-axis force sensor 6 when the foot 7 is tiled to the right or the left, then when the foot 7 is oriented obliquely to the left with respect to the edge Se as shown in FIG. 6, the position $x_R$ of the floor reactive force center determined from the output signal of the six-axis force sensor 6 with the foot 7 in the right-hand-side-edge-landed tilted attitude represents, in view of its sign, a minimum value of the position x of the floor reactive force center when the foot 7 is tilted. The position $x_L$ of the floor reactive force center determined from the output signal of the six-axis force sensor 6 with the foot 7 in the left-hand-side-edge-landed tilted attitude represents, in view of its sign, a maximum value of the position x of the floor reactive force center when the foot 7 is tilted.

Conversely, when the foot 7 is oriented obliquely to the right with respect to the edge Se, the position $x_R$ of the floor reactive force center determined from the output signal of the six-axis force sensor 6 with the foot 7 in the right-hand-side-edge-landed tilted attitude represents, in view of its sign, a maximum value of the position x of the floor reactive force center when the foot 7 is tilted. The position $x_L$ of the floor reactive force center determined from the output signal of the six-axis force sensor 6 with the foot 7 in the left-hand-side-edge-landed tilted attitude represents, in view of its sign, a minimum value of the position x of the floor reactive force center when the foot 7 is tilted.

Therefore, the positions $x_R$, $x_L$ of the points A, B at the time the foot 7 is oriented obliquely to the left with respect to the edge Se are given as minimum and maximum values, respectively, of the position x of the floor reactive force center when the foot 7 is tilted, and the positions $x_R$, $x_L$ of the points A, B at the time the foot 7 is oriented obliquely to the right with respect to the edge Se are given as maximum and minimum values, respectively, of the position x of the floor reactive force center when the foot 7 is tilted.

If the positive direction of the )-axis is backward of the foot 7, then the relationship between the positions $x_R$, $x_L$ of the points A, B and the minimum and maximum values of the position x of the floor reactive force center when the foot 7 is tilted is opposite to the above relationship.

If the positions $x_R$, $x_L$ along the X-axis of the points A, B where the right- and left-hand side edges of the foot sole 7a contact the edge Se are known, then an angle $\theta_e$ formed between the Y-axis and the edge Se as shown in FIG. 6, which is defined as an azimuthal angle $\theta_e$ of the foot 7 with respect to the edge Se, can geometrically be determined according to the following equation (4):

$$\theta_e = \sin^{-1}[-(x_R - x_L)/(d_R + d_L)] \quad (4)$$

where $d_R$, $d_L$ represent distances along the Y-axis from the reference point P to the right- and left-hand side edges, respectively, of the foot sole 7a ($d_R + d_L$ represents the distance between the right- and left-hand side edges of the foot sole 7a). In this embodiment, it is assumed that the azimuthal angle $\theta_e$ is $\theta_e > 0$ when the foot 7 is oriented obliquely to the left with respect to the edge Se as shown in FIG. 6, and $\theta_e < 0$ when the foot 7 is oriented obliquely to the right with respect to the edge Se. In this manner, the equation (4) is satisfied irrespective of whether the foot 7 is oriented obliquely to the right or the left with respect to the edge Se (the lateral direction of the foot 7 may agree with the direction of the edge Se).

Furthermore, if the positions $x_R$, $x_L$ along the X-axis of the points A, B where the right- and left-hand side edges of the foot sole 7a contact the edge Se are known, then a distance $x_e$ (see FIG. 6) along the X-axis from the reference point P to the edge Se, i.e., an X coordinate of a point of intersection between the edge Se and the X-axis ($x_e < 0$ in FIG. 6), can geometrically be determined according to the following equation (5):

$$x_e = (d_L \cdot x_R + d_R \cdot x_L)/(d_R + d_L) \quad (5)$$

As with the equation (4), the equation (5) is satisfied irrespective of whether the foot 7 is oriented obliquely to the right or the left with respect to the edge Se. If $d_R = d_L$ in the equation (5), then $x_e = (x_R + x_L)/2$, which represents an X coordinate of the midpoint of a line of contact between the foot sole 7a and the edge Se, i.e., a line segment interconnecting the points A, B.

It follows that when the foot 7 landed on the edge Se is tilted to the left or the right and the positions $x_R$, $x_L$ along the X-axis of the floor reactive force center in the right-hand-side-edge-landed tilted attitude and the left-hand-side-edge-landed tilted attitude are determined from the output signals (detected values) of the six-axis force sensor 6 according to the equation (3), or according to the equation (3)' if the detection reference point of the six-axis force sensor 6 is established at the reference point P or in the vicinity thereof, the azimuthal angle $\theta_e$ of the foot 7 with respect to the edge Se and the distance $x_e$ along the X-axis from the reference point P to the edge Se can be determined respectively according to the equations (4), (5). Based on the azimuthal angle $\theta_e$ and the distance $x_e$, the direction and position in which the foot 7 is landed with respect to the edge Se at the time the foot 7 is landed on the edge Se can be recognized.

The principles of the process of estimating the direction and position in which the foot 7 is landed with respect to the edge Se at the time the foot 7 is landed on the edge Se of the stair S according to the present embodiment have been described above.

In this embodiment, the floor reactive force center calculator 14 shown in FIG. 4 determines the position x along the X-axis of the floor reactive force center according to the equation (3) from the force components Fx, Fz along the X- and Z-axes and the moment My about the Y-axis detected by the six-axis force sensor 6 or according to the equation (3)' from the force component Fz and the moment M'y which is determined according to the equation (1) from the force component Fx and the moment My.

The landed direction/position estimator 15 estimates the positions $x_R$, $x_L$ along the X-axis of the floor reactive force center in the right-hand-side-edge-landed tilted attitude and the left-hand-side-edge-landed tilted attitude of the foot 7 from the position x of the floor reactive force center that is determined from time to time by the floor reactive force center calculator 14 when the foot 7 is tilted, while referring to the tilt start/end data and the target foot tilt angle that are supplied from the target gait generator 10. The landed direction/position estimator 15 then calculates the azimuthal angle $\theta_e$ and the distance $x_e$ from the positions $x_R$, $x_L$ according to the equations (4), (5), and supplies the azimuthal angle $\theta_e$ and the distance $x_e$ as data indicative of the direction and position in which the foot 7 is landed with respect to the edge Se to the target gait generator 10.

If the force component Fz produced from the six-axis force sensor 6 is greater than a predetermined value $F_{MIN}$, the landed state deciding unit 16 supplies a permit command for permitting the landed direction/position estimator 15 to effect a process using the force component Fz. If the force component Fz produced from the six-axis force sensor 6 is smaller than the predetermined value $F_{MIN}$, the landed state deciding unit 16 supplies an inhibit command for inhibiting the landed direction/position estimator 15 from effecting a process using the force component Fz. This is because if the force component Fz along the Z-axis detected by the six-axis force sensor 6 is too small, then the position x of the floor reactive force center cannot accurately be determined, and the azimuthal angle $\theta_e$ and the distance $x_e$ cannot accurately be determined using the inaccurate data of the position x of the floor reactive force center.

Operation of the robot R as it ascends and descends the stair S according to the first embodiment of the present invention will be described below with reference to FIGS. 7 and 8.

Figure 7:
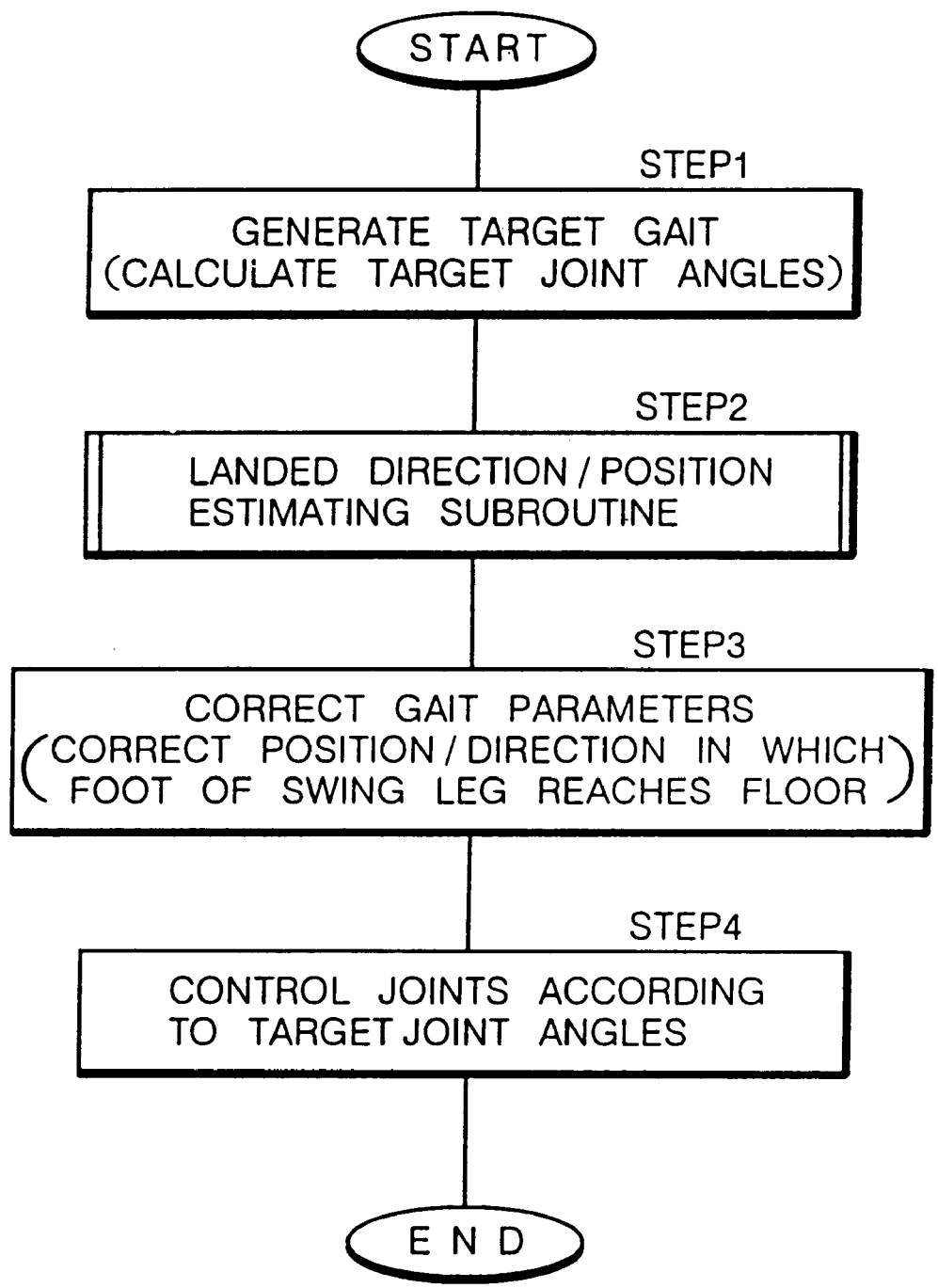
FIG. 7 is a flowchart of a main routine of the controller shown in FIG. 4.

When the robot R ascends and descends the stair S, the controller 9 executes a main routine as shown in FIG. 7 in predetermined control cycles.

The target gait generator 10 generates a target gait for each of the movable legs 3 of the robot R and calculates target joint angles for the respective joints 2, 4, 5 depending on the target gait in STEP1.

Then, the landed state recognition processor 12 executes a landed direction/position estimating subroutine for estimating and recognizing a direction and position in which the foot 7 is landed with respect to an edge Se of the stair S in STEP2.

Figure 8:
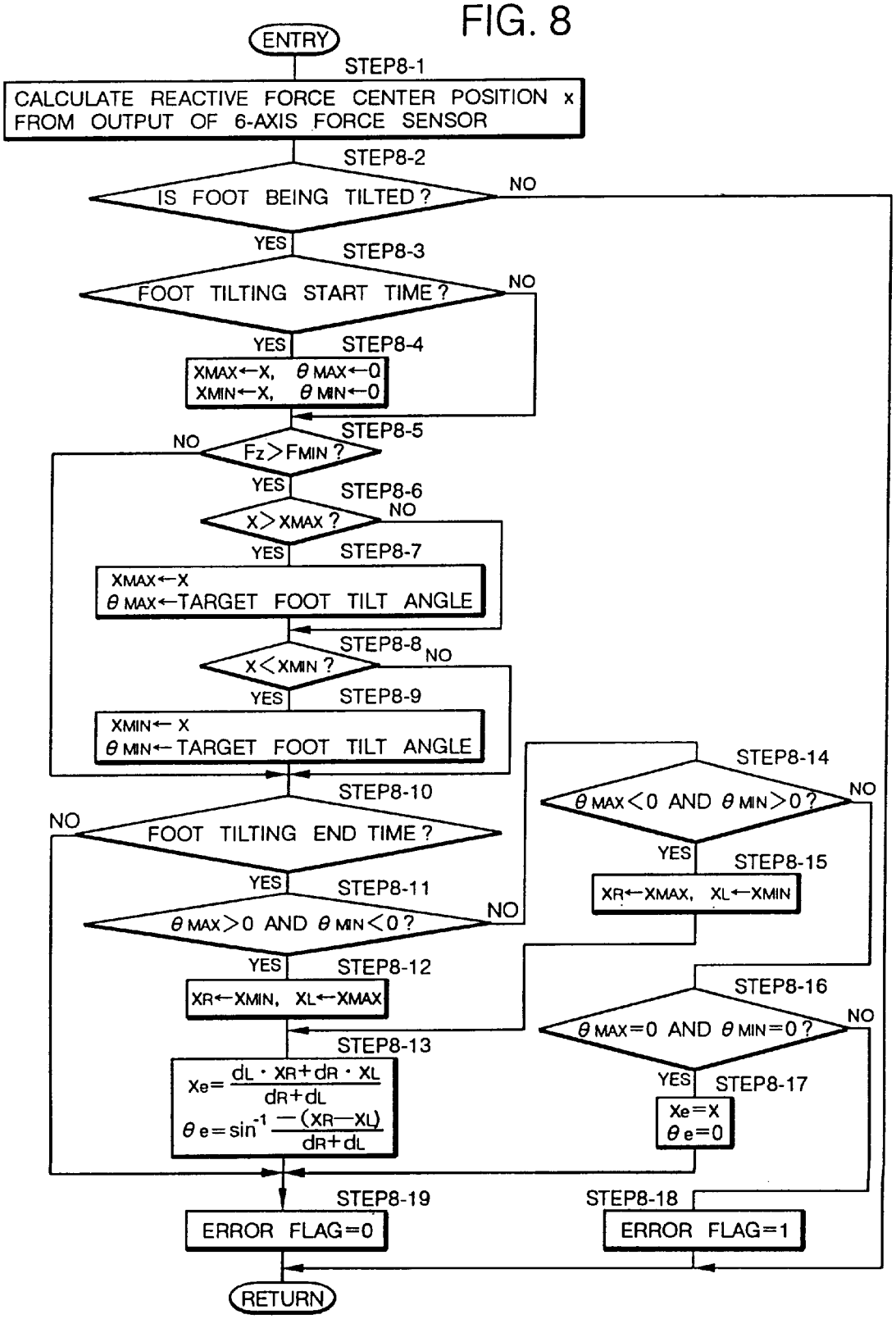
FIG. 8 is a flowchart of a landed direction/position estimating subroutine in the main routine shown in FIG. 7.

The landed direction/position estimating subroutine which is executed by the landed state recognition processor 12 is shown in FIG. 8.

As shown in FIG. 8, the floor reactive force center calculator 14 calculates the position x along the X-axis of a floor reactive force center for each of the movable legs 3 according to the equation (3) based on the force component Fx along the X-axis, the force component Fz along the Z-axis, and the moment My about the Y-axis which are detected by the six-axis force sensor 6 of each of the movable legs 3 in the present control cycle in STEP 8-1. Alternatively, if the detection reference point Q of the six-axis force sensor 6 is established at the foot sole 7a, then the floor reactive force center calculator 14 calculates the position x of a floor reactive force center according to the equation (3)' based on the force component Fz detected by the six-axis force sensor 6 and the moment M'y.

The landed state recognition processor 12 decides whether the foot 7 is being tilted to the left or the right (the foot 7 may start or end being tilted) in STEP8-2. If the foot 7 is not being tilted, then the landed direction/position estimating subroutine in the present control cycle is ended, and control returns to the main routine shown in FIG. 7.

If the foot 7 is being tilted to the left or the right (at this time, one of the feet 7 of the robot R is held in line-to-line contact with the edge Se and the ascent or descent of the robot R along the stair S is temporarily stopped), then the landed state recognition processor 12 decides whether the present time is a foot tilting start time or not based on the tilt start/end data supplied from the target gait generator 10 in STEP8-3. If the present time is a foot tilting start time, then the landed direction/position estimator 15 sets the value of the floor reactive force center position x calculated in STEP8-1 to variables $x_{MAX}$, $x_{MIN}$ and also sets "0" to variables $\theta_{MAX}$, $\theta_{MIN}$ in STEP8-4.

The variables $x_{MAX}$, $x_{MIN}$ serve to recognize maximum and minimum values, respectively, of the position x of the floor reactive force center that are determined in each control cycle in STEP8-1 while the foot 7 is being tilted. The variables $\theta_{MAX}$, $\theta_{MIN}$ serve to recognize tilt angles of the foot 7 which correspond respectively to maximum and minimum values, respectively, of the position x of the floor reactive force center.

If the present time is not a foot tilting start time, i.e., if the foot 7 has started being tilted, in STEP8-3, then STEP8-4 is skipped.

Then, the landed state deciding unit 16 decides whether the force component Fz detected by the six-axis force sensor 6 in the present control cycle is greater than a predetermined value $F_{MIN}$ or not in STEP8-5. If Fz> $F_{MIN}$, then the landed state deciding unit 16 issues a permit command to the landed direction/position estimator 15, which operates as follows:

The landed direction/position estimator 15 decides whether the position x (with its positive or negative sign considered) of the floor reactive force center determined in STEP8-1 in the present control cycle is greater than the present value of the variable $x_{MAX}$ in STEP8-6. If x>$x_{MAX}$, then the value of the variable $x_{MAX}$ is updated with the value of the position x of the floor reactive force center determined in STEP8-1, and the value of the variable $\theta_{MAX}$ is updated with the target foot tilt angle supplied from the target gait generator 10 in the present control cycle in STEP8-7. If x≦$x_{MAX}$ in STEP8-6, then the processing in STEP8-7 is skipped, and the variables $x_{MAX}$, $\theta_{MAX}$ are maintained at their present values.

The landed direction/position estimator 15 decides whether the position x of the floor reactive force center determined in STEP8-1 is smaller than the present value of the variable $x_{MIN}$ in STEP8-8. If x<$x_{MIN}$, then the value of the variable $x_{MIN}$ is updated with the value of the position x of the floor reactive force center determined in STEP8-1, and the value of the variable $\theta_{MIN}$ is updated with the target foot tilt angle supplied from the target gait generator 10 in the present control cycle in STEP8-9. If x≧$x_{MIN}$ in STEP8-8, then the processing in STEP8-9 is skipped, and the variables $x_{MIN}$, $\theta_{MIN}$ are maintained at their present values.

If Fz≦$F_{MIN}$ in STEP8-5, i.e., if the force component Fz detected by the six-axis force sensor 6 is too small, then since the accuracy of the position x determined in STEP8-1 is so low that the position x is not reliable, the processing in STEP8-6–STEP8-9 is skipped.

The processing in STEP8-6–STEP8-9 is executed in each control cycle while the foot 7 is being tilted to the left and the right, so that maximum and minimum values of the position x along the X-axis of the floor reactive force center (when the position x has a negative value, it is smaller as the absolute value thereof is greater) are obtained respectively as final values of the variables $x_{MAX}$, $x_{MIN}$, and a tilt angle of the foot 7 at the time the position x is maximum and a tilt angle of the foot 7 at the time the position x is minimum are obtained respectively as final values of the variables $\theta_{MAX}$, $\theta_{MIN}$.

When the foot 7 is oriented obliquely to the left with respect to the edge Se as shown in FIG. 6, the position $x_R$ of the floor reactive force center (the point. A in FIG. 6) with the foot 7 in the right-hand-side-edge-landed tilted attitude basically represents a minimum value of the position x of the floor reactive force center when the foot 7 is tilted, and the position $x_L$ of the floor reactive force center (the point B in FIG. 6) with the foot 7 in the left-hand-side-edge-landed tilted attitude basically represents a maximum value of the position x of the floor reactive force center when the foot 7 is tilted. Therefore, final values of the variables $x_{MAX}$, $x_{MIN}$ indicate the position, $x_L$, $x_R$, respectively.

When the foot 7 is oriented obliquely to the right with respect to the edge Se, the position $x_R$ of the floor reactive force center with the foot 7 in the right-hand-side-edge-landed tilted attitude basically represents a maximum value of the position x of the floor reactive force center when the foot 7 is tilted, and the position $x_L$ of the floor reactive force center with the foot 7 in the left-hand-side-edge-landed tilted attitude basically represents a minimum value of the position x of the floor reactive force center when the foot 7 is tilted. Therefore, final values of the variables $x_{MAX}$, $x_{MIN}$ indicate the positions $x_R$, $x_L$, respectively.

In this embodiment, the target foot tilt angle, which is related to the variables $\theta_{MAX}$, $\theta_{MIN}$, is of a positive value when the foot 7 is tilted to the left, and a negative value when the foot 7 is tilted to the right. Therefore, when the foot 7 is oriented obliquely to the left with respect to the edge Se, final values of the variables $\theta_{MAX}$, $\theta_{MIN}$ that are obtained so as to correspond respectively to variables $x_{MAX}$, $x_{MIN}$ are of positive and negative values, respectively, and when the foot 7 is oriented obliquely to the right with respect to the edge Se, final values of the variables $\theta_{MAX}$, $\theta_{MIN}$ that are obtained so as to correspond respectively to variables $x_{MAX}$, $x_{MIN}$ are of negative and positive values, respectively.

When the Y-axis of the foot 7 is in line with the direction of the edge Se, the position x of the floor reactive force center determined in each control cycle in STEP8-1 basically remains unchanged. Therefore, during the processing in STEP8-6–STEP8-9 while the foot 7 is being tilted, the variables $\theta_{MAX}$, $\theta_{MIN}$ are basically maintained at the value "0" which has been established in STEP8-4.

Referring back to FIG. 8, the landed state recognition processor 12 decides whether the present time is a foot tilting end time or not based on the tilt start/end data supplied from the target gait generator 10 in STEP8-10. If the present time is a foot tilting end time, the landed direction/position estimator 15 decides whether the final values of the variables $\theta_{MAX}$, $\theta_{MIN}$ are of positive and negative values, respectively, or not in STEP8-11. If $\theta_{MAX}$>0 and $\theta_{MIN}$<0, then the foot 7 is landed obliquely to the left with respect to the edge Se. The landed direction/position estimator 15 sets the final values of the variables $x_{MIN}$, $x_{MAX}$ to the values of $x_R$, $x_L$ in the equations (4), (5) in STEP8-12, and determines the azimuthal angle $\theta_e$ of the foot 7 with respect to the edge Se and the distance $X_e$ along the X-axis from the reference point P to the edge Se according to the equations (4), (5), respectively, in STEP8-13.

If the condition in STEP8-11 is not met, then the landed direction/position estimator 15 decides whether the final values of the variables $\theta_{MAX}$, $\theta_{MIN}$ are of negative and positive values, respectively, or not in STEP8-14. If $\theta_{MAX}$<0 and $\theta_{MIN}$>0, then the foot 7 is landed obliquely to the right with respect to the edge Se. The landed direction/position estimator 15 sets the final values of the variables $x_{MAX}$, $x_{MIN}$ to the values of $x_R$, $x_L$ in the equations (4), (5) in STEP8-15, and determines the azimuthal angle $\theta_e$ and the distance $x_e$ according to the equations (4), (5), respectively, in STEP8-13.

If the condition in STEP8-14 is not met, then the landed direction/position estimator 15 decides whether both the final values of the variables $\theta_{MAX}$, $\theta_{MIN}$ are "0" or not in STEP8-16. If $\theta MAX=0$ and $\theta_{MIN}=0$, then the Y-axis, i.e., the lateral direction, of the foot 7 is in line with the direction of the edge Se. The landed direction/position estimator 15 sets "0" to the value of the azimuthal angle $\theta_e$, and also sets the value of the position x of the floor reactive force center determined in STEP8-1 in the present cycle at the time the foot 7 ends being tilted, i.e., the position along the X-axis of the floor reactive force center while the foot sole 7a and the edge Se are held in line-to-line contact with each other, to the value of the distance $x_e$ in STEP8-17.

When the Y-axis of the foot 7 is in line with the direction of the edge Se, the position x of the floor reactive force center determined from time to time while the foot 7 is being tilted may tend to vary somewhat due to a detection error of the six-axis force sensor 6. As a result, after the processing in STEP8-6–STEP8-9, the condition in STEP8-11 or STEP8-14 may be met, and the azimuthal angle $\theta_e$ and the distance $x_e$ may be determined according to the equations (4), (5), respectively, in STEP8-13. In this case, since any variation of the position x of the floor reactive force center while the foot 7 is being tilted is small, the final values of the variables $x_{MAX}$, $x_{MIN}$ obtained through the processing in STEP8-6–STEP8-9 are substantially equal to each other. These values are also in agreement with the value of the position x of the floor reactive force center when the foot 7 starts or ends being tilted. Therefore, the azimuthal angle $\theta_e$ and the distance $x_e$ which are determined according to the equations (4), (5) in this instance are substantially the same as the azimuthal angle $\theta_e$ and the distance $x_e$ which are determined in STE?8-17. Consequently, even if both the final values of the variables $x_{MAX}$, $x_{MIN}$ are "0", the azimuthal angle $\theta_e$ and the distance $x_e$ may be determined according to the equations (4), (5).

If the condition in STEP8-16 is not met, i.e., if either one of the variables $\theta_{MAX}$, $\theta_{MIN}$ is of a positive or a negative value, then since such an instance is normally impossible, an error flag indicative of some malfunctioning is set to "1" in STEP8-18. Thereafter, the landed direction/position estimating subroutine is finished, and control returns to the main routine.

After the azimuthal angle $\theta_e$ and the distance $x_e$ are determined in STEP8-13 or STEP8-17, the error flag is reset to "0" in STEP8-19. Then, the landed direction/position estimating subroutine is finished, and control returns to the main routine.

If the present time is not a foot tilting end time in STEP8-10, then control jumps to STEP8-19, after which the landed direction/position estimating subroutine is finished, and control returns to the main routine. In this case, the processing in STEP8-6–STEP8-9 is continued in each control cycle.

In this manner, when the foot 7 of the robot R is landed on the edge Se of the stair S, the azimuthal angle $\theta_e$ of the foot 7 with respect to the edge Se and the distance $x_e$ along the X-axis, i.e., in the longitudinal direction, of the foot 7, from the reference point P to the edge Se are determined, and the direction and position in which the foot 7 is landed with respect to the edge Se are determined on the basis of the azimuthal angle $\theta_e$ and the distance $x_e$.

Referring back to FIG. 7, after the landed state recognition processor 12 has executed the landed direction/position estimating subroutine in STEP2, the controller 9 corrects parameters (specifically, parameters for defining a position and direction in which the foot 7 of the support leg is landed with respect to the foot 7 of the swing leg) for defining a stride, etc. of the target gait generated for each of the movable legs 3 by the target gait generator 10 in subsequent control cycles, based on the azimuthal angle $\theta_e$ (landed direction) and the distance $x_e$ (landed position) which have been detected by the landed state recognition processor 12 as described above, in STEP3.

Specifically, when the robot R ascends the stair S, if the landed position of the foot 7 of one of the movable legs 3 with respect to the edge Se is closer to the toe than the heel of the foot 7 when it starts to touch the stair S, then the controller 9 corrects the parameters of the target gait so as to slightly increase the stride of the other movable leg 3 when the foot 7 of the other movable leg 3 leaves or touches the stair S next time. If the landed direction of the foot 7 of one of the movable legs 3 with respect to the edge Se is oriented obliquely to the left when the foot 7 starts to touch the stair S, then the controller 9 corrects the parameters of the target gait so as to orient the foot 7 of the other movable leg 3 slightly obliquely to the right when the foot 7 of the other movable leg 3 leaves or touches the stair S next time. Conversely, if the landed direction of the foot 7 of one of the movable legs 3 with respect to the edge Se is oriented obliquely to the right when the foot 7 start to touch the stair S, then the controller 9 corrects the parameters of the target gait so as to orient the foot 7 of the other movable leg 3 slightly obliquely to the left when the foot 7 of the other movable leg 3 leaves or touches the stair S next time.

When the robot R descends the stair S, if the landed position of the foot 7 of one of the movable legs 3 with respect to the edge Se is closer to the heel than the toe of the foot 7 when it ends leaving the stair S, then the controller 9 corrects the parameters of the target gait so as to slightly reduce the stride of the other movable leg 3 when the foot 7 of the other movable leg 3 touches the stair S next time. If the landed direction of the foot 7 of one of the movable legs 3 with respect to the edge Se is oriented obliquely to the left or the right when the foot 7 ends leaving the stair S, then the controller 9 corrects the parameters of the target gait in the same manner as when the robot R ascends the stair S.

The target gait parameters are corrected after the azimuthal angle $\theta_e$ and the distance $x_e$ have been determined in the landed direction/position estimating subroutine in STEP2, and are not corrected while the foot 7 is being tilted to the left or the right.

After having corrected the target gait parameters, the joint controller 11 controls the actuators (not shown) to actuate the joints 2, 4, 5 according to the target joint angles for the joints 2, 4, 5 which have been calculated by the target gait generator 10 in STEP4.

According to the above motion control for the robot R, the gait of the robot R as it ascends or descends the stair S is corrected depending on the landed direction and the landed position of the foot 7 with respect to the edge Se. As a result, the robot R can ascend and descend the stair S stably without missing stair steps and without going in improper directions.

The landed direction and the landed position of the foot 7 with respect to the edge Se, necessary for the above motion control for the robot R, can be recognized by simple calculations from the positions $x_R$, $x_L$ along the X-axis of the floor reactive force center in the right-hand-side-edge-landed tilted attitude and the left-hand-side-edge-landed tilted attitude, which positions $x_R$, $x_L$ are determined from the detected values Fx, Fz, My (the moment M'y obtained from the detected values Fx, My and the detected value Fz) from the six-axis force sensor 6 or the detected values Fz, M'y (if the detection reference point of the six-axis force sensor 6 is established on the foot sole 7a) when the foot 7 is tilted to the left or the right at the time the foot 7 is landed on the edge Se. Since the position x of the floor reactive force center for recognizing the landed direction and the landed position is determined from the output signals from the six-axis force sensor 6, the position x is not adversely affected by dirt, smear, etc. on the floor including the stair S. Furthermore, inasmuch as the six-axis force sensor 6 is disposed above the foot 7 and will not contact the floor, the six-axis force sensor 6 is protected against damage and is highly durable.

In this embodiment, the positions $x_R$, $x_L$ along the X-axis of the floor reactive force center in the right-hand-side-edge-landed tilted attitude and the left-hand-side-edge-landed tilted attitude of the foot 7 are recognized from maximum and minimum values of the position x of the floor reactive force center when the foot 7 is tilted. However, positions x of the floor reactive force center obtained from the output signals from the six-axis force sensor 6 at maximum tilt angles of the foot 7 as it is tilted to the right and the left may be used as the positions $x_R$, $x_L$ along the X-axis of the floor reactive force center in the right-hand-side-edge-landed tilted attitude and the left-hand-side-edge-landed tilted attitude of the foot 7, and the azimuthal angle $\theta_e$ (landed direction) and the distance $x_e$ (landed position) may be determined according to the equations (4) and (5).

In this embodiment, the width ($d_R+d_L$) of the foot 7 is constant. However, the foot 7 may be of any arbitrary shape. If the foot 7 is of any arbitrary shape, the values of $d_R$, $d_L$ when the foot 7 is in an arbitrary position (X coordinate) along the X-axis are stored in advance according to a function or the like. When the positions $x_R$, $x_L$ of the floor reactive force center at the time the foot 7 is tilted are determined as described above, values of $d_R$, $d_L$ corresponding to the positions $x_R$, $x_L$ are determined, and the azimuthal angle $\theta_e$ and the distance $x_e$ are determined using the determined values of $d_R$, $d_L$ according to the equations (4) and (5).

If the magnitude (absolute value) of the azimuthal angle $\theta_e$ can be regarded as being sufficiently small, the azimuthal angle $\theta_e$ may be determined according to the following equation (4)', rather than the equation (4):

$$\theta_e = -(x_R - x_L)/(d_R + d_L) \tag{4'}$$

A second embodiment of the present invention will be described below with reference to FIGS. 9 through 12. A legged moving robot used in the second embodiment is the same as the biped locomotion robot (including the six-axis force sensor) used in the first embodiment, and will be described using the reference characters in FIGS. 1 through 3.

Prior to describing the second embodiment in specific detail, a brief summary thereof and the principles of a process of recognizing the direction and position in which the foot 7 is landed with respect to the edge Se at the time the foot 7 is landed on the edge Se of the stair S according to the second embodiment will be described below.

According to the first embodiment, the azimuthal angle $\theta_e$ indicative of the landed direction of the foot 7 with respect to the edge Se and the distance $x_e$ indicative of the landed position of the foot 7 with respect to the edge Se are determined using the distances $d_R$, $d_L$ along the Y-axis (lateral direction) from the reference point P to the right- and left-hand side edges of the foot 7, i.e., the positions of the points A, B along the Y-axis as shown in FIG. 6. For accurately determining the azimuthal angle $\theta_e$ and the distance $x_e$, it is necessary to tilt the foot 7 in order to bring the left- and right-hand side edges of the foot 7 into reliable point-to-point contact with the edge Se. To bring the left- and right-hand side edges of the foot 7 into reliable point-to-point contact with the edge Se, the foot 7 needs to be tilted through relatively large angles to the left and the right. However, such large tilting of the foot 7 may not be possible due to structural limitations of the robot R. In such a case, it is difficult to accurately determine the azimuthal angle $\theta_e$ and the distance $x_e$ for recognizing the landed direction of the foot 7 and the landed position of the foot 7.

In the second embodiment, when the foot 7 is tilted to the left or the right, not only the position x of the floor reactive force center along the X-axis, i.e., in the longitudinal direction, of the foot 7, but also the position of the floor reactive force center along the Y-axis, i.e., in the lateral direction, of the foot 7 are recognized for accurately recognizing the landed direction of the foot 7 with respect to the edge Se and the landed position of the foot 7 with respect to the edge Se.

Figure 9:
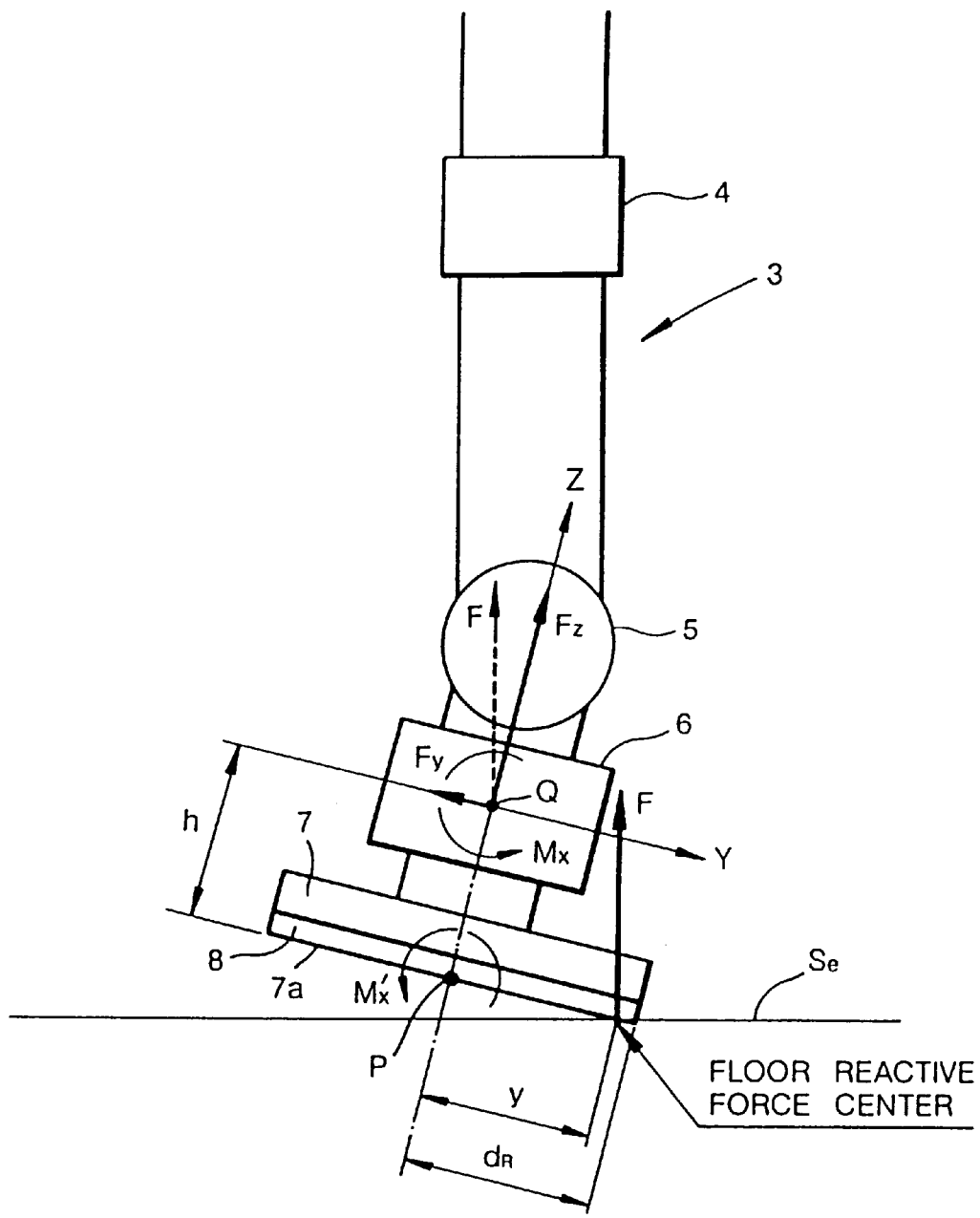
FIG. 9 is an elevational view illustrative of a process of recognizing the direction and position in which a foot of the robot is landed according to a second embodiment of the present invention.

The position along the Y-axis of the floor reactive force center can be recognized in the same manner as with the position x along the X-axis of the floor reactive force center, as follows:

FIG. 9 shows the foot 7 landed on the edge Se of the stair S, and then tilted to the right, so that the foot 7 is landed on the edge Se near the right-hand side edge of the foot sole 7a. In FIG. 9, an XYZ coordinate system is established on the six-axis force sensor 6. Under the reactive force F applied from the stair S to the foot 7, a moment M'x (which is positive in the direction indicated by the arrow in FIG. 9) is generated about an axis passing through the reference point P on the foot sole 7a and parallel to the X-axis, i.e., an axis extending in the longitudinal direction of the foot 7 and perpendicularly to the sheet of FIG. 9. Using the force component Fy (Fy<0 in FIG. 9) along the Y-axis detected by the six-axis force sensor 6, the moment Mx about the X-axis (which is positive in the direction indicated by the arrow in FIG. 9), and the distance h from the foot sole 7a to the detection reference point Q of the six-axis force sensor 6, the moment M'x is expressed by the following equation (6):

$$M'x = Mx - Fy \cdot h \tag{6}$$

When the foot 7 is landed as shown in FIG. 9, the position along the Y-axis of the floor reactive force center is a position y (y>0 in FIG. 9), for example. Using the position y and the force component Fz (Fz<0 in FIG. 9) along the Z-axis (normal to the foot sole 7a) detected by the six-axis force sensor 6, the moment M'x is expressed by the following equation (7):

$$M'x = Fz \cdot y \tag{7}$$

From the equations (6), (7), the following equation (8) is obtained:

$$y = M'x/Fz = (Mx - Fy \cdot h)/Fz \quad (8)$$

As with the position x of the floor reactive force center, the equation (8) is satisfied at any landed state of the foot 7. When the foot 7 is landed on the edge Se near the left-hand side edge of the foot sole 7a, since the direction of the moment M'x is opposite to the direction shown in FIG. 9, the position y along the Y-axis of the floor reactive force center as determined according to the equation (8) is of a negative value.

Therefore, the position y along the Y-axis (in the lateral direction of the foot 7) of the floor reactive force center when the foot 7 is landed on the edge Se (and tilted) can be determined according to the equation (8) from the force components Fy, Fz along the Y- and Z-axes and the moment Mx about the X-axis detected by the six-axis force sensor 6.

Since the force component Fx along the X-axis of the floor reactive force center can be determined from the output signals (detected values) of the six-axis force sensor 6, as described above in the first embodiment, both the position x along the X-axis of the floor reactive force center and the position y along the Y-axis of the floor reactive force center can be determined from the output signals of the six-axis force sensor 6.

If the detection reference point of the six-axis force sensor 6 is established as the reference point P on the foot sole 7a, then the moment M'x can directly be detected by the six-axis force sensor 6. In this case, the position y along the Y-axis of the floor reactive force center can be determined according to the following equation (8)':

$$y = M'x/Fz \quad (8)'$$

Thus, the position y along the Y-axis of the floor reactive force center can be determined from the moment M'x about the reference point P on the foot sole 7a and the force component Fz along the Z-axis, which are detected either directly or indirectly.

Figure 10:
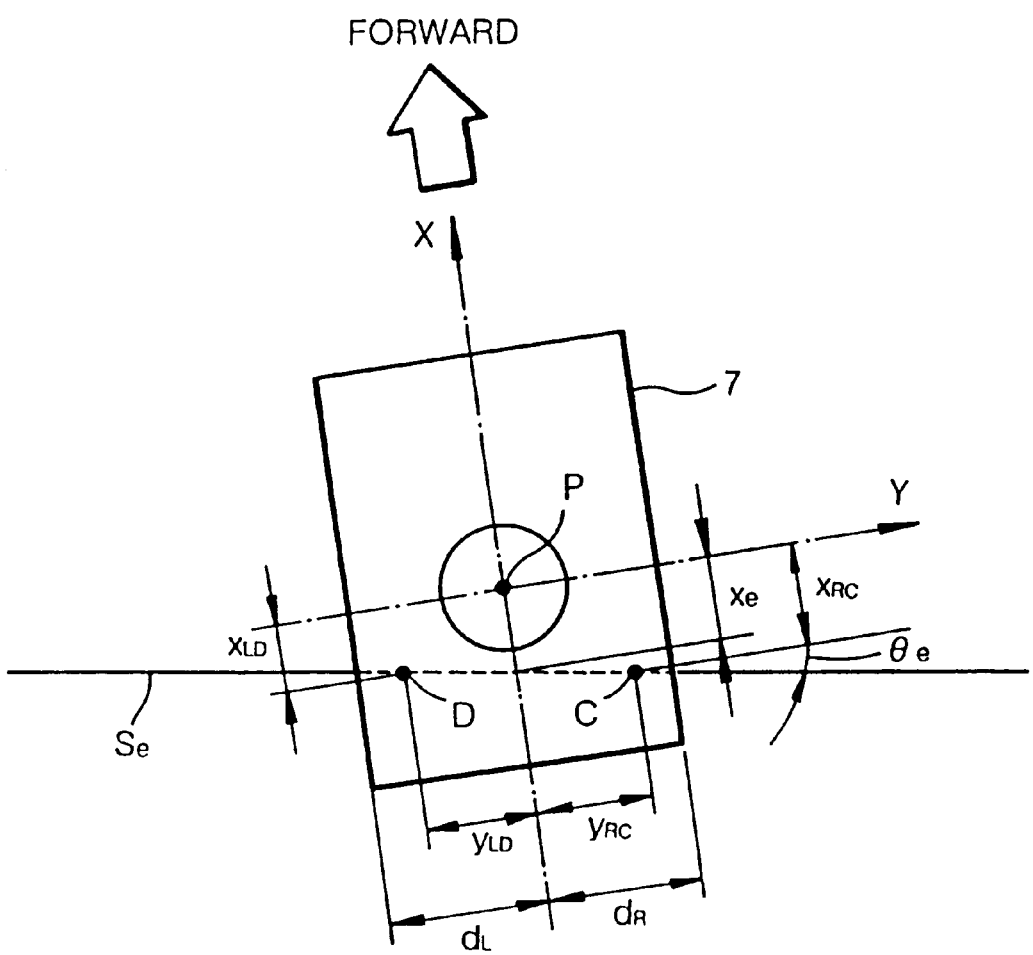
FIG. 10 is a plan view illustrative of the process of recognizing the direction and position in which the foot of the robot is landed according to the second embodiment of the present invention.

After the foot 7 is held in line-to-line contact with the edge Se of the stair S, as shown in FIG. 10, the floor reactive force center reached when the foot 7 is then tilted to the right into a tilted attitude (hereinafter referred to as a "right-hand tilted attitude") in which the foot sole 7a is landed near its right-hand side edge, and the floor reactive force center reached when the foot 7 is then tilted to the left into a tilted attitude (hereinafter referred to as a "left-hand tilted attitude") in which the foot sole 7a is landed near its left-hand side edge are located respectively at points C, D in FIG. 10. These points C, D lie on a line of contact between the foot sole 7a and the edge Se while the foot 7 is not being tilted, i.e., a line indicated by the broken line in FIG. 10. The direction and position of the line interconnecting the points C, D with respect to the foot 7 represent the direction and position of the edge Se with respect to the foot 7.

If the positions along the X- and Y-axes of the point C near the right-hand side edge of the foot 7 are represented respectively by $x_{RC}$, $y_{RC}$ ($y_{RC} > 0$), and the positions along the X- and Y-axes of the point D near the left-hand side edge of the foot 7 are represented respectively by $x_{LD}$, $y_{LD}$ ($y_{LD} > 0$), then an azimuthal angle $\theta_e$ of the foot 7 with respect to the edge Se, i.e., an angle $\theta_e$ formed between the Y-axis and the edge Se, can geometrically be determined according to the following equation (9):

$$\theta_e = \sin^{-1}[-(x_{RC} - x_{LD})/(y_{RC} - y_{LD})] \quad (9)$$

The distance along the X-axis from the reference point P to the line interconnecting the points C, D, i.e., the distance $x_e$ along the X-axis from the reference point P to the edge Se, can geometrically be determined according to the following equation (10):

$$x_e = (y_{RC} \cdot x_{LD} - y_{LD})/(y_{RC} - y_{LD}) \quad (10)$$

The equations (9), (10) are satisfied irrespective of whether the foot 7 is oriented to the left or the right with respect to the edge Se, and even when the lateral direction (Y-axis) of the foot 7 is in line with the direction of the edge Se.

Consequently, when the positions $x_{RC}$, $x_{LD}$ along the X-axis of the floor reactive force center and the positions $y_{RC}$, $y_{LD}$ along the Y-axis of the floor reactive force center are determined according to the equations (3), (8) from the output signals of the six-axis force sensor 6 with the foot 7 in the right-hand tilted attitude and the left-hand tilted attitude or according to the equations (3)', (8)' if the detection reference point of the six-axis force sensor 6 is on the foot sole 7a, it is possible to determine the azimuthal angle $\theta_e$ and the distance $x_e$ which are indicative respectively of the landed direction of the foot 7 with respect to the edge Se and the landed position of the foot 7 with respect to the edge Se.

The principles of the process of estimating the direction and position in which the foot 7 is landed with respect to the edge Se at the time the foot 7 is landed on the edge Se of the stair S according to the second embodiment have been described above.

The second embodiment will now be described in specific detail below.

Figure 11:
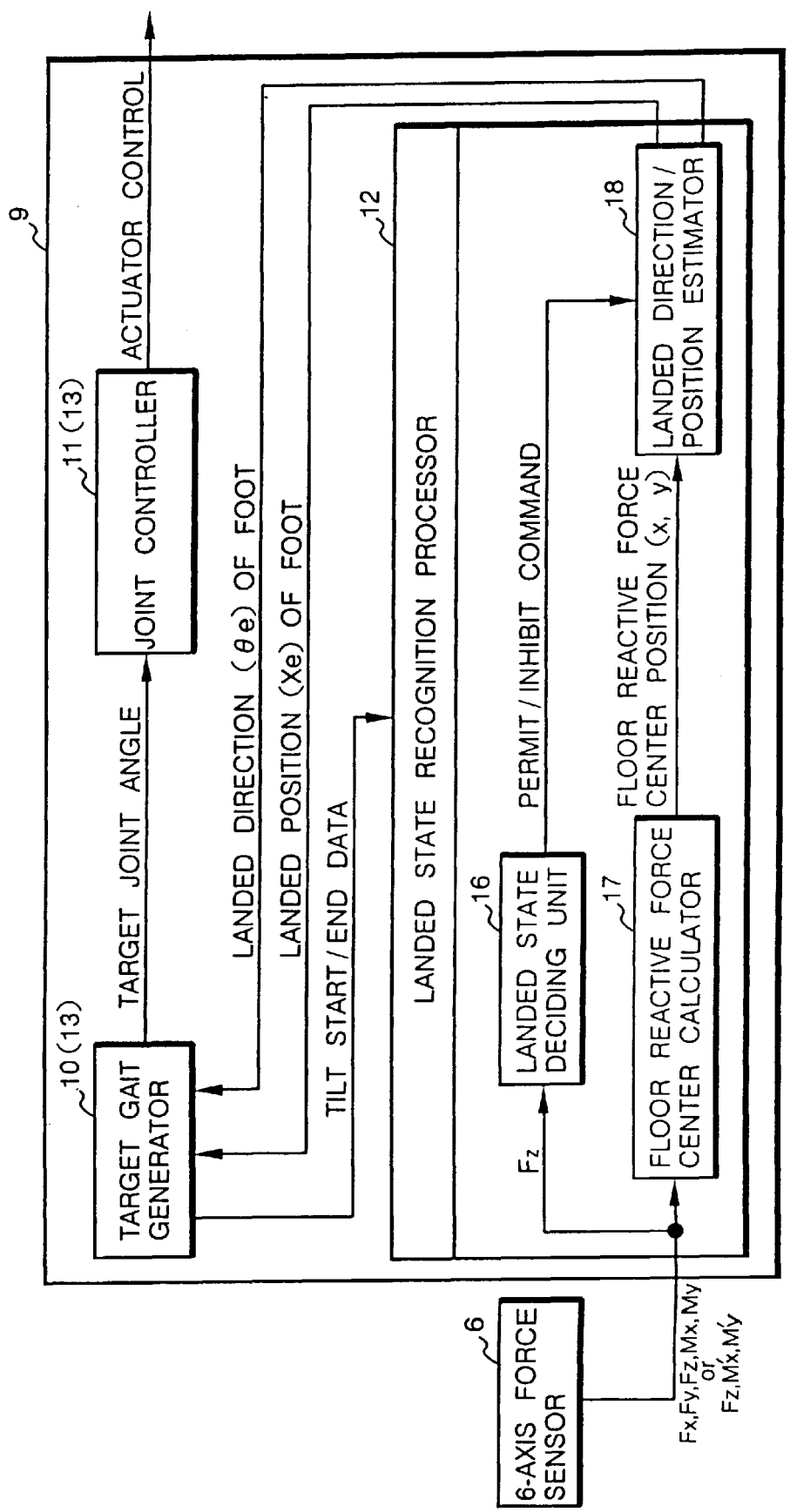
FIG. 11 is a block diagram of a controller according to the second embodiment of the present invention, which is installed on the legged moving robot.

According to the second embodiment, as shown in FIG. 11, the robot R has a controller 9 which has, as its functions, a target gait generator 10, a joint controller 11, and a landed state recognition processor 12 as with the first embodiment.

The target gait generator 10 and the joint controller 11 have the same functions as those of the first embodiment. According to the second embodiment, however, the foot 7 does not need to be tilted to the left and the right so as to bring the left- and right-hand side edges of the foot 7 into point-to-point contact with the edge Se for recognizing the azimuthal angle $\theta_e$ (landed direction) and the distance $x_e$ (landed position). For tilting the foot 7 landed on the edge Se to the left and the right, the target gait generator 10 generates a target gait to tilt the foot 7 so as to land regions of the foot 7 near the left- and right-hand side edges thereof on the edge Se.

The landed state recognition processor 12 comprises a floor reactive force center calculator 17 for calculating in each control cycle the position x along the X-axis of the floor reactive force center and the position y along the Y-axis of the floor reactive force center (hereinafter referred to as "positions (x, y) of the floor reactive force center") according to the equations (3), (8) from the output signals of the six-axis force sensor 6, or according to the equations (3)', (8)' if the detection reference point of the six-axis force sensor 6 is on the foot sole 7a, a landed direction/position estimator 18 for estimating, as described later on, the azimuthal angle $\theta_e$ and the distance $x_e$ which are indicative respectively of the landed direction of the foot 7 with respect to the edge Se and the landed position of the foot 7 with respect to the edge Se, from the positions (x, y) of the floor reactive force center that are determined from time to time by the floor reactive force center calculator 17 when the foot 7 is tilted, and a landed state deciding unit 16 which performs the same function as the landed state deciding unit 16 according to the first embodiment.

Operation of the robot R as it ascends and descends the stair S according to the second embodiment of the present invention will be described below with reference to FIG. 12.

Figure 12:
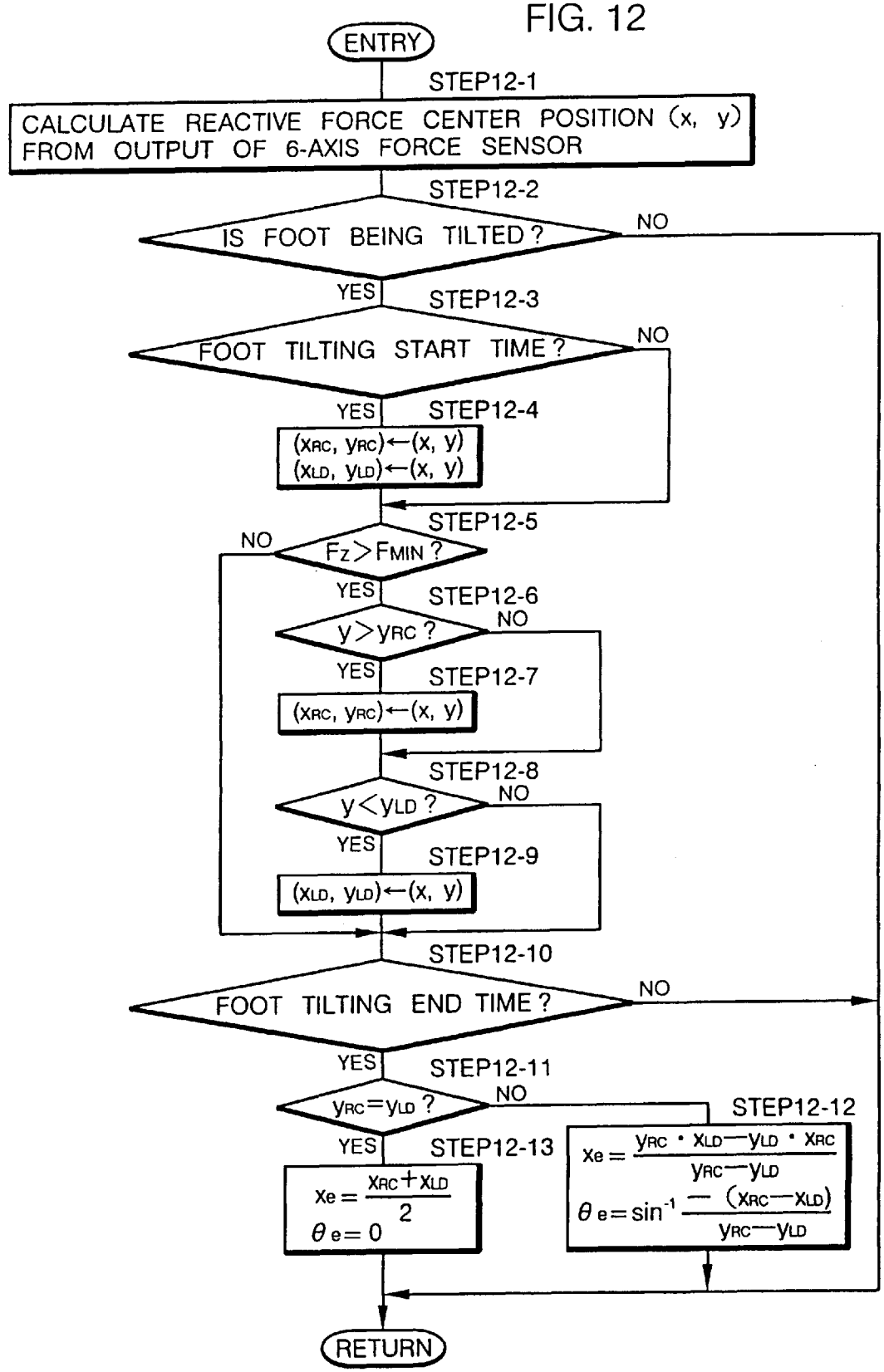
FIG. 12 is a flowchart of a main routine of the controller shown in FIG. 11.

When the robot R ascends and descends the stair S, the controller 9 executes the main routine as shown in FIG. 7 in predetermined control cycles. In the landed direction/ position estimating subroutine in STEP2 shown in FIG. 7, the landed state recognition processor 12 determines the azimuthal angle $\theta_e$ and the distance $x_e$ as follows:

As shown in FIG. 12, the floor reactive force center calculator 17 calculates in each control cycle positions (x, y) of the floor reactive force center according to the equations (3), (8) from the output signals of the six-axis force sensor 6, or according to the equations (3)', (8)' if the detection reference point of the six-axis force sensor 6 is on the foot sole 7a, in STEP12-1

Then, the landed state recognition processor 12 decides whether the foot 7 is being tilted to the left or the right in STEP12-2. If the foot 7 is not being tilted, then the landed direction/position estimating subroutine in the present control cycle is ended, and control returns to the main routine shown in FIG. 7.

If the foot 7 is being tilted to the left or the right (at this time, one of the feet 7 of the robot R is held in line-to-line contact with the edge Se and the ascent or descent of the robot R along the stair S is temporarily stopped), then the landed state recognition processor 12 decides whether the present time is a foot tilting start time or not based on the tilt start/end data supplied from the target gait generator 10 in STEP12-3. If the present time is a foot tilting start time, then the landed direction/position estimator 18 sets the positions (x, y) of the floor reactive force center determined in the present cycle in STEP12-1, i.e., the position of the floor reactive force center while the foot sole 7a is held in line-to-line contact with the edge Se, to initial values of the positions $(x_{RC}, y_{RC})$ of the floor reactive force center with the foot 7 in the right-hand tilted attitude and the positions $(x_{LD}, Y_{LD})$ of the floor reactive force center with the foot 7 in the left-hand tilted attitude in STEP12-4.

If the present time is not a foot tilting start time, i.e., if the foot 7 has started being tilted, in STEP12-3, then STEP12-4 is skipped.

Then, the landed state deciding unit 16 decides whether the force component Fz detected by the six-axis force sensor 6 in the present control cycle is greater than a predetermined value $F_{MIN}$ or not in STEP12-5. If $Fz>F_{MIN}$, then the landed state deciding unit 16 issues a permit command to the landed direction/position estimator 18, which operates as follows:

The landed direction/position estimator 18 decides whether the position y along the Y-axis of the floor reactive force center determined in STEP12-1 in the present control cycle is greater than the present value of $y_{RC}$ in STEP12-6. If $y>y_{RC}$, then the values of the positions $(x_R C, y_{RC})$ of the floor reactive force center with the foot 7 in the right-hand tilted attitude are replaced with the values of the positions (x, y) of the floor reactive force center determined in STEP12-1, in STEP12-7. While the foot 7 is being tilted to the right, since the floor reactive force center basically moves along the edge Se in the position direction of the Y-axis, i.e., rightward of the foot 7, the positions $(x_{RC}, y_{RC})$ of the floor reactive force center are successively updated by the processing in STEP12-7.

If $y \leq y_{RC}$ in STEP12-6, e.g., if the foot 7 is being titled to the left, then the processing in STEP12-7 is skipped, and the positions $(x_{RC}, y_{RC})$ of the floor reactive force center with the foot 7 in the right-hand tilted attitude are maintained at their present values.

The landed direction/position estimator 18 decides whether the position y along the Y-axis of the floor reactive force center determined in STEP12-1 in the present control cycle is smaller than the present value of $y_{LD}$ in STEP12-8. If $y<y_{LD}$, then the values of the positions $(x_{LD}, y_{LD})$ of the floor reactive force center with the foot 7 in the left-hand tilted attitude are replaced with the values of the positions (x, y) of the floor reactive force center determined in STEP12-1, in STEP12-9. While the foot 7 is being tilted to the left, since the floor reactive force center basically moves along the edge Se in the negative direction of the Y-axis, i.e., leftward of the foot 7, the positions $(x_{LD}, y_{LD})$ of the floor reactive force center are successively updated by the processing in STEP12-9.

If $y \geq y_{LD}$ in STEP12-8, e.g., if the foot 7 is being titled to the right, then the processing in STEP12-9 is skipped, and the positions $(x_{LD}, y_{LD})$ of the floor reactive force center with the foot 7 in the left-hand tilted attitude are maintained at their present values.

If $Fz \leq F_{MIN}$ in STEP12-5, i.e., if the force component Fz detected by the six-axis force sensor 6 is too small, then since the accuracy of the positions (x, y) determined in STEP12-1 is so low that the positions (x, y) are not reliable, the processing in STEP12-6–STEP12-9 is skipped.

The processing in STEP12-6–STEPl2-9 is executed in each control cycle while the foot 7 is being tilted to the left and the right, so that the positions $(x_{RC}, y_{RC})$ of the floor reactive force center with the foot 7 in the right-hand tilted attitude are finally given as the positions (x, y) of the floor reactive force center where the position along the Y-axis is maximum (>0). In this manner, the positions $(x_{RC}, y_{RC})$ (the position of the point C in FIG. 10) of the floor reactive force center with the foot 7 in such a tilted attitude that the foot 7 is landed on the edge Se near the right-hand side edge of the foot sole 7a are determined.

Similarly, the positions $(x_{LD}, y_{LD})$ Df the floor reactive force center with the foot 7 in the left-hand tilted attitude are finally given as the positions (x, y) of the floor reactive force center where the position along the Y-axis is minimum (<0). In this manner, the positions $(x_{LD}, y_{LD})$ (the position of the point D in FIG. 10) of the floor reactive force center with the foot 7 in such a tilted attitude that the foot 7 is landed on the edge Se near the left-hand side edge of the foot sole 7a are determined.

Then, the landed state recognition processor 12 decides whether the present time is a foot tilting end time or not based on the tilt start/end data supplied from the target gait generator 10 in STEP12-10. If the present time is a foot tilting end time, the landed direction/position estimator 18 decides whether the final values of $y_{RC}, y_{LD}$ are equal to each other or not in STEP12-11. If the landed direction/ position estimator 18 confirms that $y_{RC} \neq y_{LD}$, i.e., if the landed direction/position estimator 18 confirms that the denominator of each of the equations (9), (10) is not "0", then the landed direction/position estimator 18 determines the azimuthal angle $\theta_e$ indicative of the landed direction of the foot 7 with respect to the edge Se according to the equation (9), and also determines the distance $x_e$ indicative of the landed position of the foot 7 with respect to the edge Se according to the equation (10) in STEP12—12. Thereafter, the landed direction/position estimating subroutine is ended, and control returns to the main routine.

The position along the Y-axis of the floor reactive force center basically moves along the edge Se in opposite directions when the foot 7 is tilted to the right and to the left. Therefore, the condition $y_{RC}=y_{LD}$ is basically not possible in STEP12-11. However, if the condition $y_{RC}=y_{LD}$ takes place due to some malfunctioning, then the landed direction/ position estimator 18 tentatively sets the value of the azimuthal angle $\theta_e$ to "0", and also sets the value of the distance $x_e$ to an intermediate value $(x_{RC}+X_{LD})/2$ between the final values of $X_{RC}, X_{LE}$) in STEP12-13. Thereafter, the landed direction/position estimating subroutine is ended, and control returns to the main routine. The processing in STEP12-13 may be replaced with a process of setting an error flag as with the first embodiment.

If the present time is not a foot tilting end time in STEP12-10, then the landed direction/position estimating subroutine in the present control cycle is finished, and control returns to the main routine. In this case, the processing in STEP12-6–STEP12-9 is continued in each control cycle.

The azimuthal angle $\theta_e$ and the distance $x_e$ which are thus determined are supplied as data indicative of the direction and position in which the foot 7 is landed with respect to the edge Se to the target gait generator 10. In the main routine shown in FIG. 7, the controller 9 corrects parameters for defining a stride of the robot R, a direction movement of the robot R, etc. of the target gait as with the first embodiment.

As described above, when the robot R ascends or descends the stair S, the landed direction (the azimuthal angle $\theta_e$) and the landed position (the distance $x_e$) of the foot 7 with respect to the edge Se when the foot 7 is landed on the edge Se are determined, and the gait of the robot R is corrected. Consequently, as with the first embodiment, the robot R can ascend or descend the stair S stably without missing stair steps and without going in improper directions.

Because not only the position x along the X-axis, but also the position y along the Y-axis, of the floor reactive force center are determined when the foot 7 is tilted, the direction and position in which the foot 7 is landed with respect to the edge Se can accurately be recognized from the positions (x, y) of the floor reactive force center in tilted attitudes of the foot 7 by tilting the foot 7 to the left and the right such that the foot 7 will be landed on the edge Se near the left- and right-hand side edges thereof, without having to tilt the foot 7 to a large extent. Inasmuch as not only the position x along the X-axis, but also the position y along the Y-axis, of the floor reactive force center are determined, the direction and position in which the foot 7 is landed with respect to the edge Se can accurately be recognized irrespective of the shape of the foot 7.

The positions (x, y) of the floor reactive force center for recognizing the landed direction and position of the foot 7 can be determined by simple calculations according to the equations (3), (8) or the equations (3)', (8)' based on the output signals from the six-axis force sensor 6.

Since the positions (x, y) of the floor reactive force center for recognizing the landed direction and position of the foot 7 are determined from the six-axis force sensor 6, the positions (x, y) are not adversely affected by dirt, smear, etc. on the floor including the stair S. Furthermore, inasmuch as the six-axis force sensor 6 is disposed above the foot 7 and will not contact the floor, the six-axis force sensor 6 is protected against damage and is highly durable.

In this embodiment, the positions $(x_{RC}, y_{RC})$ $(X_{LD}, y_{LD})$ of the floor reactive force center, which are used in the calculations according to the equations (9), (10) are the positions (x, y) of the floor reactive force center where the position y along the Y-axis is maximum or minimum. However, the positions (x, y) of the floor reactive force center at the time the foot 7 is tilted maximally to the right may be used as the values of $(x_{RC}, y_{RC})$, and the positions (x, y) of the floor reactive force center at the time the foot 7 is tilted maximally to the left may be used as the values of $(x_{LD}, y_{LD})$ In this embodiment, the foot 7 is tilted to both the left and the right. However, the foot 7 may be tilted to either the left or the right, and the processing shown in FIG. 12 may be carried out when the foot 7 is thus tilted, for recognizing the landed direction and position of the foot 7. Alternatively, when the foot 7 is tilted to either the left or the right, the landed direction and position of the foot 7 may be recognized from the positions (x, y) of the floor reactive force center that are determined at two different tilt angles of the foot 7.

For recognizing the landed direction and position of the foot 7 as accurately as possible, it is preferable that the two positions (x, y) of the floor reactive force center used for recognizing them be spaced relatively largely from each other in view of a detection error of the six-axis force sensor 6, a calculation error, or the like. To this end, it is preferable to tilt the foot 7 to both the left and the right rather than tilting the foot 7 to either the left or the right.

In this embodiment, if the magnitude (absolute value) of the azimuthal angle $\theta_e$ can be regarded as being sufficiently small, the azimuthal angle $\theta_e$ may be determined according to the following equation (9)', rather than the equation (9):

$$\theta_e = -(x_{RC} - x_{LD})/(y_{RC} y_{LD}) \tag{9}$$

A third embodiment of the present invention will be described below with reference to FIGS. 13 through 16. A legged moving robot used in the third embodiment is the same as the biped locomotion robot (including the six-axis force sensor) used in the first and second embodiments, and will be described using the reference characters in FIGS. 1 through 3.

According to the third embodiment, as with the second embodiment, the azimuthal angle $\theta_e$ indicative of the landed direction of the foot 7 with respect to the edge Se and the distance $x_e$ indicative of the landed position of the foot 7 with respect to the edge Se are determined using the positions (x, y) along the X-axis (longitudinal direction) and the Y-axis (transverse direction) of the floor reactive force center, determined from the output signals of the six-axis force sensor 6 when the foot 7 landed on the edge Se is tilted. In the third embodiment, the azimuthal angle $\theta_e$ and the distance $x_e$ are determined using a number of data of the positions (x, y) of the floor reactive force center obtained from time to time when the foot 7 is tilted to the left and the right.

The third embodiment will be described in specific detail below.

Figure 13:
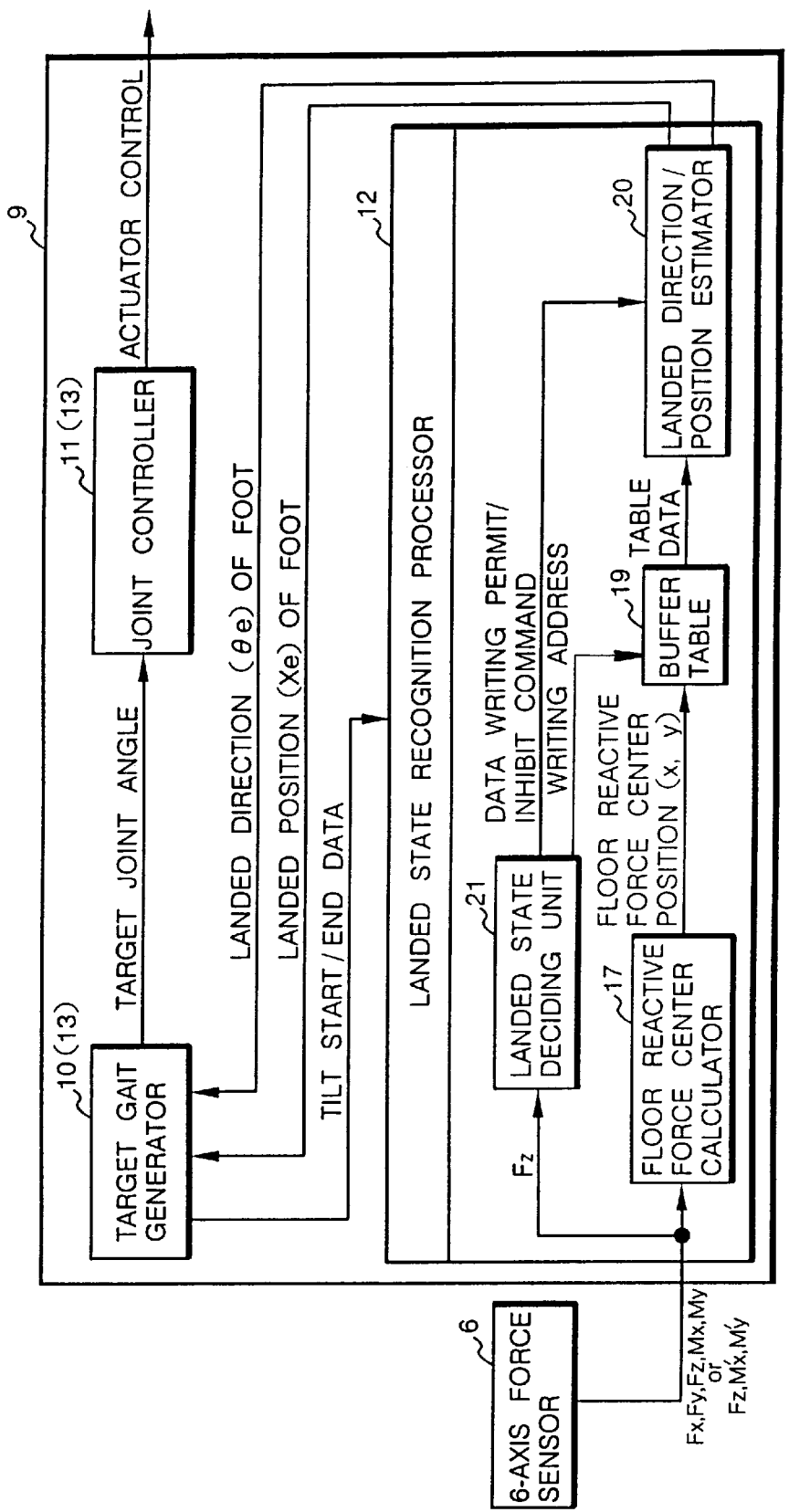
FIG. 13 is a block diagram of a controller according to a third embodiment of the present invention, which is installed on the legged moving robot.

According to the third embodiment, as shown in FIG. 13, the robot R has a controller 9 which has, as its functions, a target gait generator 10, a joint controller 11, and a landed state recognition processor 12 as with the second embodiment.

The target gait generator 10 and the joint controller 11 have the same functions as those of the second embodiment.

The landed state recognition processor 12 comprises a floor reactive force center calculator 17 which is the same as the floor reactive force center calculator 17 according to the second embodiment, a buffer table 19 for storing data of positions (x, y) of the floor reactive force center which are determined from time to time by the floor reactive force center calculator 17 when the foot 7 is tilted, a landed direction/position estimator 20 for estimating, as described later on, the azimuthal angle $\theta_e$ and the distance $x_e$ which are indicative respectively of the landed direction of the foot 7 with respect to the edge Se and the landed position of the foot 7 with respect to the edge Se, from the data of positions (x, y) of the floor reactive force center that are stored in the buffer table 19, and a landed state deciding unit 21 for comparing the force component Fz obtained from the six-axis force sensor 6 with the predetermined value $F_{MIN}$ to supply the buffer table 19 with a command (data writing permit/inhibit command) for permitting or inhibiting the storage (writing) of the data of positions (x, y) of the floor reactive force center into the buffer table 19 and to indicate a write address where the data of positions (x, y) of the floor reactive force center are to be stored to the buffer table 19 if the storage of the data of positions (x, y) is permitted.

Operation of the robot R as it ascends and descends the stair S according to the third embodiment of the present invention will be described below.

Figure 14:
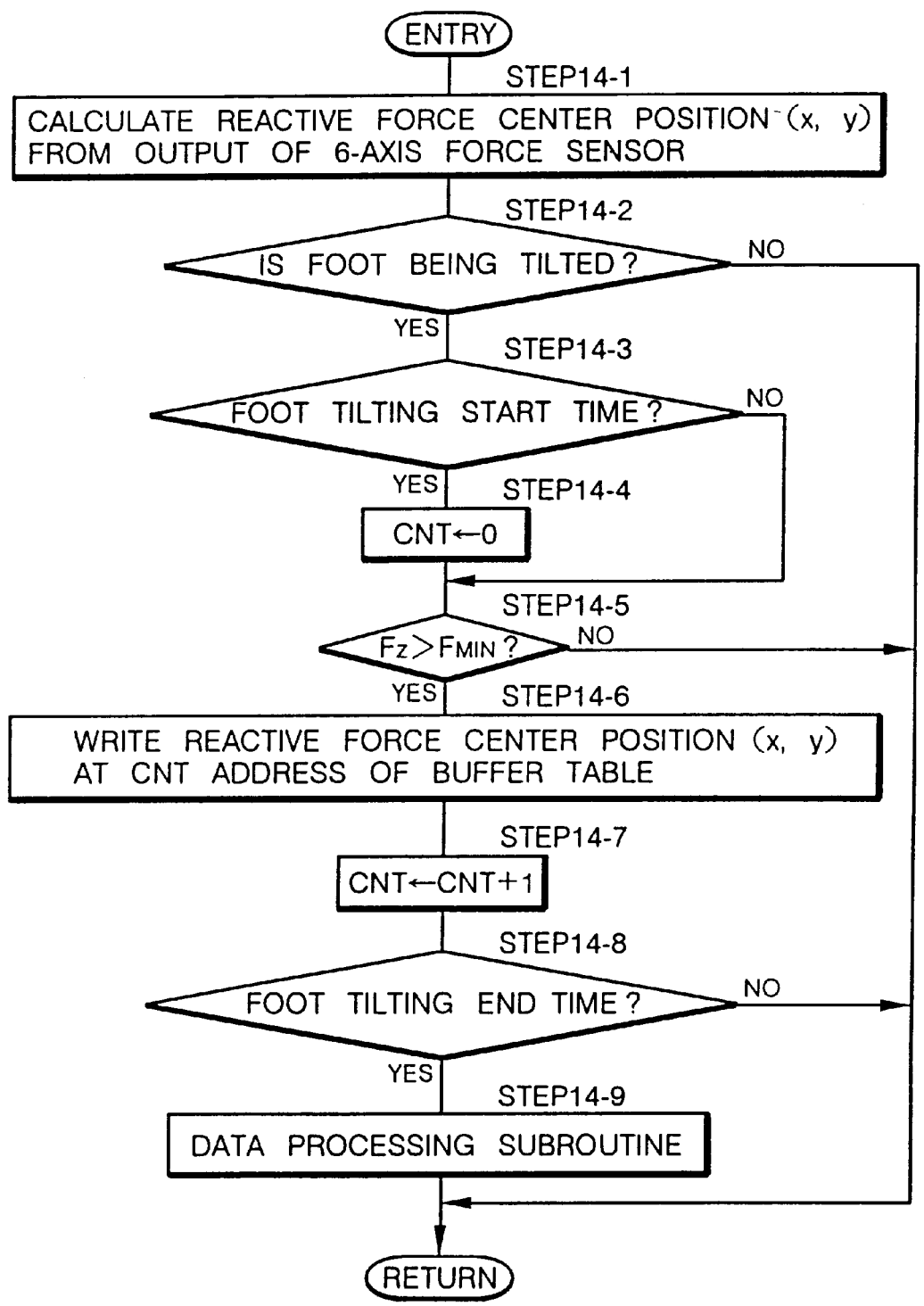
FIG. 14 is a flowchart of a main routine of the controller shown in FIG. 13.

When the robot R ascends and descends the stair S, the controller 9 executes the main routine as shown in FIG. 7 in predetermined control cycles. In the landed direction/position estimating subroutine in STEP2 shown in FIG. 7, the landed state recognition processor 12 determines the azimuthal angle $\theta_e$ and the distance $x_e$ as follows:

As shown in FIG. 14, the floor reactive force center calculator 17 calculates in each control cycle positions (x, y) of the floor reactive force center according to the equations (3), (8) from the output signals of the six-axis force sensor 6, or according to the equations (3)', (8)' if the detection reference point of the six-axis force sensor 6 is on the foot sole 7a, in STEP14-1.

Then, the landed state recognition processor 12 decides whether the foot 7 is being tilted to the left or the right in STEP14-2. If the foot 7 is not being tilted, then the landed direction/position estimating subroutine in the present control cycle is ended, and control returns to the main routine shown in FIG. 7.

If the foot 7 is being tilted to the left or the right (at this time, one of the feet 7 of the robot R is held in line-to-line contact with the edge Se and the ascent or descent of the robot R along the stair S is temporarily stopped), then the landed state recognition processor 12 decides whether the present time is a foot tilting start time or not based on the tilt start/end data supplied from the target gait generator 10 in STEP14-3. If the present time is a foot tilting start time, then the landed state deciding unit 21 initializes a counter value CNT indicative of the write address of the buffer table 19 to "0" in STEP14-4. If the present time is not a foot tilting start time, then the processing in STEP14-4 is skipped.

Then, the landed state deciding unit 21 decides whether the force component Fz detected by the six-axis force sensor 6 in the present control cycle is greater than a predetermined value $F_{MIN}$ or not in STEP14-5. If $Fz > F_{MIN}$, then the landed state deciding unit 21 issues a permit command to the buffer table 19 to permit the data of the positions (x, y) of the floor reactive force center to be written in the buffer table 19, and also gives the present counter value CNT to the buffer table 19. Now, the data of the positions (x, y) of the floor reactive force center which have been determined in STEP14-1 are written in the storage area at the write address in the buffer table 19 which is represented by the counter value CNT in STEP14-6.

If $Fz \leq F_{MIN}$ in STEP14-5, then since the force component Fz detected by the six-axis force sensor 6 is too small and the positions (x, y) of the floor reactive force center which have been determined in STEP14-1 are not reliable, the processing in STEP14-6 is skipped, and the landed direction/position estimating subroutine in the present control cycle is ended.

After the data of the positions (x, y) of the floor reactive force center are written in the buffer table 19 in STEP14-6, the landed state deciding unit 21 increments the counter value CNT by "1" in STEP14-7. Thereafter, the landed state recognition processor 12 decides whether the present time is a foot tilting start time or not based on the tilt start/end data supplied from the target gait generator 10 in STEP14-8. If the present time is not a foot tilting start time, then the landed direction/position estimating subroutine in the present control cycle is ended. If the present time is a foot tilting end time, then the landed state recognition processor 12, more specifically, landed direction/position estimator 20, executes a data processing subroutine for processing the data stored in the buffer table 19, as described later on, in STEP14-9.

According to the landed direction/position estimating subroutine shown in FIG. 14, when the foot 7 landed on the edge Se is tilted, the buffer table 19 stores the data of the positions (x, y) of the floor reactive force center determined from the output signals for the six-axis force sensor 6 (except the data when $Fz \leq F_{MIN}$) in each control cycle. The number of stored data of the positions (x, y) is equal to the final counter value CNT.

Prior to describing the data processing subroutine in STEP14-9, the data of the positions (x, y) of the floor reactive force center stored in the buffer table 19 will be described below with reference to FIG. 16.

Figure 16:
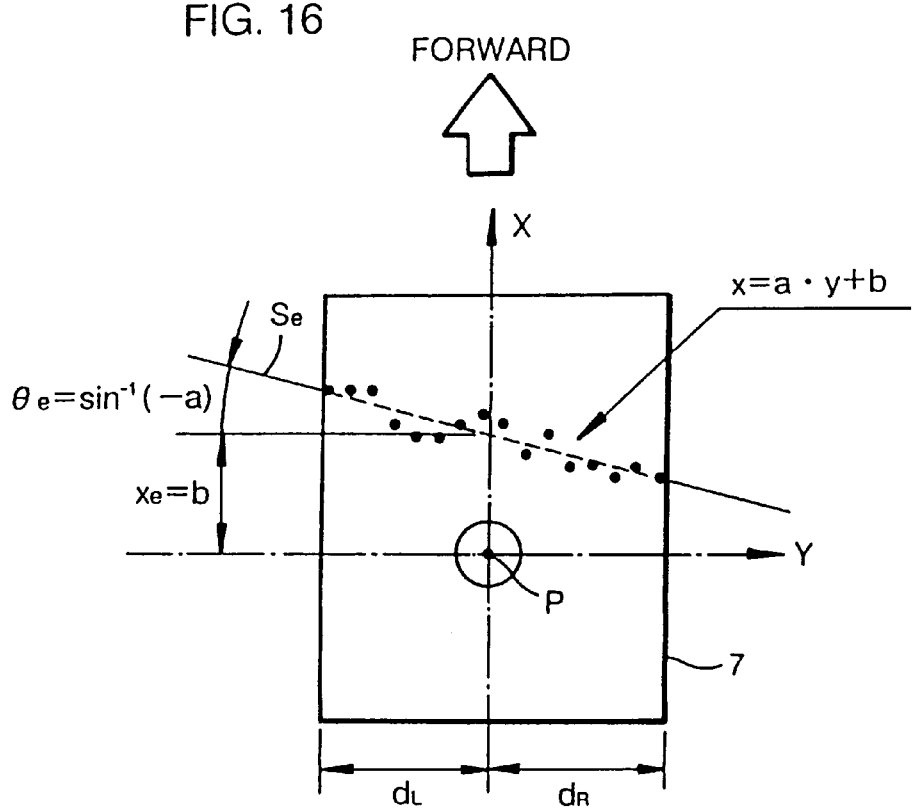
FIG. 16 is a plan view illustrative of a process of recognizing the direction and position in which a foot of the robot is landed according to the third embodiment of the present invention.

As shown in FIG. 16, the floor reactive force center at the time the foot 7 landed on the edge Se is tilted to the left and the right exists on the line of contact (indicated by the broken line in FIG. 16) between the foot 7 as it is not tilted and the edge Se. However, the positions (x, y) of the floor reactive force center which are actually determined from the output signals for the six-axis force sensor 6 when the foot 7 is tilted suffer slight variations from the above line of contact due to a detection error, for example, of the six-axis force sensor 6. As a consequence, the data of the positions (x, y) of the floor reactive force center stored in the buffer table 19 are actually represented as a train of solid dots shown in FIG. 16.

Since the line of contact is a straight line passing approximately through the train of solid dots, if a function indicative of a straight line approximating the train of solid dots is determined from the data of the positions (x, y) of the floor reactive force center according to the method of least squares, then such a function represents the direction and position of the line of contact with respect to the foot 7, i.e., the direction and position of the edge Se with respect to the foot 7.

If it is assumed that the function indicative of the straight line approximating the train of solid dots which represent the positions (x, y) of the floor reactive force center is $x = a \cdot y + b$ (where a is the gradient of the straight line and b is the intercept of the straight line on the X-axis), then the azimuthal angle $\theta_e$ indicative of the landed direction of the foot 7 with respect to the edge Se and the distance $x_e$ indicative of the landed position of the foot 7 with respect to the edge Se are given respectively by the following equations (11), (12):

$$\theta_e = \sin^{-1}(-a) \quad (11)$$

$$x_e = b \quad (12)$$

Therefore, when the function $x = a \cdot y + b$ indicative of the straight line approximating the train of solid dots is determined from the data of the positions (x, y), the azimuthal angle $\theta_e$ and the distance $x_e$ are determined from the values of a, b of the function according to the equations (11), (12).

Figure 15:
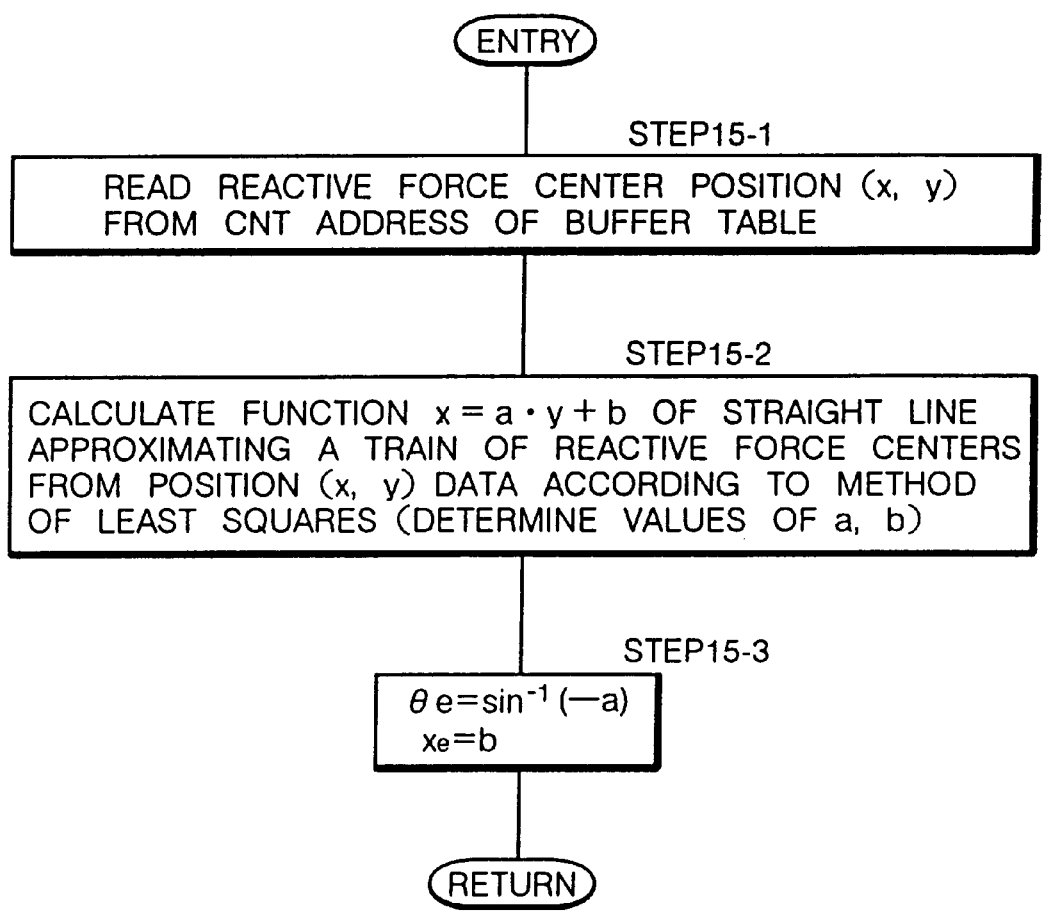
FIG. 15 is a flowchart of a data processing subroutine in the main routine shown in FIG. 14.

The data processing subroutine in STEP14-9 shown in FIG. 14 is executed by the landed direction/position estimator 20 as shown in FIG. 15.

As shown in FIG. 15, the landed direction/position estimator 20 reads the data of the positions (x, y) of the floor reactive force center from as many addresses of the buffer table 19 as indicated by the final counter value CNT in STEP15-1.

Then, the landed direction/position estimator 20 determines the function x=·y+b indicative of the straight line approximating the train of solid dots represented by the read data, where a, b are unknowns, according to the method of least squares from the data of the positions (x, y) read in STEP15-1, i.e., determines the values of a, b, in STEP15-2.

Using the values of a, b of the function x=a·y+b determined in STEP15-2, the landed direction/position estimator 20 calculates the azimuthal angle $\theta_e$ indicative of the landed direction of the foot 7 with respect to the edge Se according to the equation (11), and also calculates the distance $x_e$ indicative of the landed position of the foot 7 with respect to the edge Se according to the equation (12) in STEP15-3. Thereafter, the data processing subroutine is finished.

When the data processing subroutine is finished, the landed direction/position estimating subroutine is also finished.

The azimuthal angle $\theta_e$ and the distance $x_e$ which are thus determined are supplied as data indicative of the direction and position in which the foot 7 is landed with respect to the edge Se to the target gait generator 10. In the main routine shown in FIG. 7, the controller 9 corrects parameters for defining a stride of the robot R, a direction movement of the robot R, etc. of the target gait as with the first embodiment.

As described above, when the robot R ascends or descends the stair S, the landed direction (the azimuthal angle $\theta_e$) and the landed position (the distance $x_e$) of the foot 7 with respect to the edge Se when the foot 7 is landed on the edge Se are determined, and the gait of the robot R is corrected. Consequently, as with the first and second embodiments, the robot R can ascend or descend the stair S stably without missing stair steps and without going in improper directions.

Using many data of the positions (x, y) of the floor reactive force center at the time the foot 7 is tilted, the function approximating the train of dots representing the floor reactive force center, stated otherwise, the function approximating the edge Se of the stair S, is determined, and the landed direction and position of the foot 7 with respect to the edge Se is recognized according to the determined function. Consequently, the landed direction and position of the foot 7 with respect to the edge Se can be recognized while minimizing adverse effects of a detection error of the six-axis force sensor 6. Furthermore, as with the second embodiment, since both the position x along the X-axis and the position y along the Y-axis of the floor reactive force center are determined, the direction and position in which the foot 7 is landed with respect to the edge Se can accurately be recognized irrespective of the shape of the foot 7.

Furthermore, the positions (x, y) of the floor reactive force center for recognizing the landed direction and position of the foot 7 can be determined by as simple calculations as with the second embodiment. Furthermore, as with the second embodiment, the six-axis force sensor 6 is not affected by dirt on the floor, and is protected against damage and is highly durable.

In the third embodiment, the foot 7 is tilted to the left and the right for recognizing the landed direction and position of the foot 7 with respect to the edge Se. However, as with the second embodiment, the foot 7 may be tilted to either the left or the right.

If the magnitude (absolute value) of the azimuthal angle $\theta_e$ can be regarded as being sufficiently small, the azimuthal angle $\theta_e$ may be determined according to the following equation (11)', rather than the equation (11):

$$\theta_e = a \quad (11)'$$

In the third embodiment, the train of dots representing the floor reactive force center at the time the foot 7 is tilted is approximated by the function=a·y+b which represents a straight line. However, the train of dots representing the floor reactive force center may be approximated by a function of higher degree. If the train of dots is approximated by a quadratic function x=f(y)=c·y²+d·y+e, for example, then when the foot 7 is landed on the edge Se as shown in FIG. 16 (the magnitude (absolute value) of the coefficient c in the quadratic function is very small), the azimuthal angle $\theta_e$ and the distance $x_e$ are given respectively by the following equations (13), (14):

$$\theta_e = \sin^{-1}[-(f(d_R)-f(-d_L))/(d_R+d_L)] \quad (13)$$

$$x_e = f(0) = e \quad (14)$$

where $f(d_R)$ and $f(-d_L)$ indicate respective positions along the X-axis of points of contact between the right- and left-hand side edges of the foot 7 and the edge Se. Therefore, the equation (13) is essentially the same as the equation (4) in the first embodiment.

Figure 17:
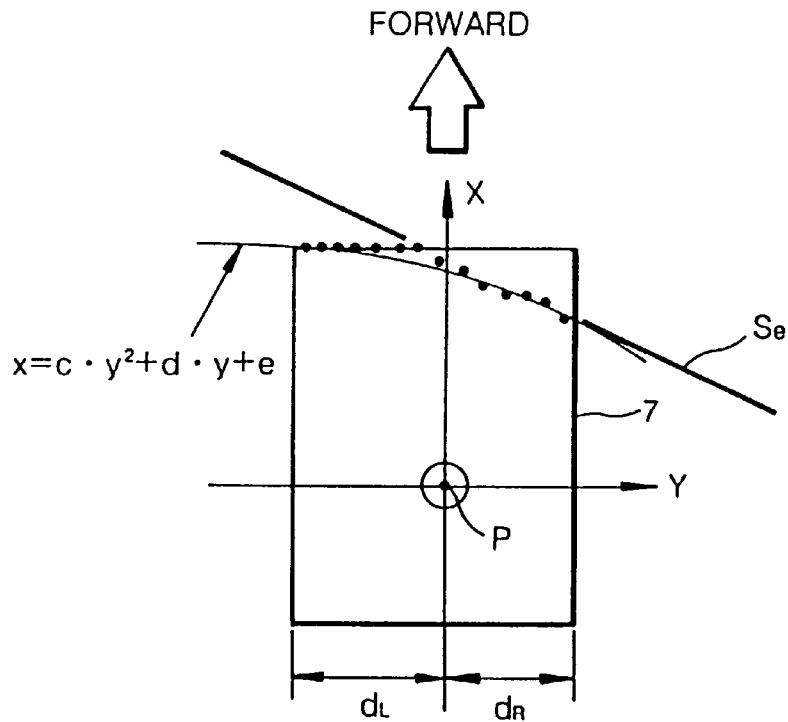
FIG. 17 is a plan view showing a modification of the third embodiment of the present invention.

If the train of dots representing the floor reactive force center at the time the foot 7 is tilted is approximated by the quadratic function x=f(y) As described above, then the azimuthal angle $\theta_e$ and the distance $x_e$ indicative of the landed direction and position of the foot 7 with respect to the edge Se can be determined, and also the following advantages are offered:

When the foot 7 ends leaving the stair S while the robot R is descending the stair S, if the foot 7 is landed inappropriately on the edge Se with only a portion of the toe of the foot 7 projects forward of the edge Se as shown in FIG. 17 (in this embodiment, the entire toe of the foot 7 should normally project forward of the edge Se as shown in FIG. 16), then data of the positions (x, y) of the floor reactive force center produced when the foot 7 is tilted to the left and the right are represented by a train of solid dots as shown in FIG. 17. Specifically, in a region where the foot 7 is landed on the edge Se, the floor reactive force center at the time the foot 7 s tilted is arranged substantially along the edge Se. However, in a region where the foot 7 is not landed on the edge Se, i.e., the foot 7 is landed on the step Ss, the floor reactive force center at the time the foot 7 is tilted is arranged substantially along the front edge of the foot 7.

Therefore, if the train of dots is approximated by the quadratic function x=f(y)=c·y² +d·y+e, then the magnitude (absolute value) of the coefficient c is greater than when the foot 7 is landed normally as shown in FIG. 16 (in this case, the magnitude of the coefficient c is very small). Consequently, when the magnitude of the coefficient c exceeds a certain value, it can be determined that the foot 7 is landed improperly on the edge Se, and the movement of the robot R can be corrected accordingly.

In each of the above embodiments of the present invention, the azimuthal angle $\theta_e$ indicative of the landed direction of the foot 7 with respect to the edge Se is the angle formed between the edge Se and the Y-axis or the lateral direction of the foot 7. However, the angle formed between the edge Se and the X-axis or the longitudinal direction of the foot 7 may be used as the azimuthal angle indicative of the landed direction of the foot 7 with respect to the edge Se, and this azimuthal angle may be determined from the data of the floor reactive force center at the time the foot 7 is tilted, as with each of the above embodiments.

In each of the above embodiments of the present invention, the landed position of the foot 7 with respect to the edge Se is recognized from the distance $x_e$ along the X-axis from the reference point P on the foot sole 7a to the edge Se. However, the landed position of the foot 7 may be recognized from the distance along the X-axis from an arbitrary point on the foot, other than the reference point, e.g., a front or rear edge of the foot sole 7a, to the edge Se.

In each of the above embodiments of the present invention, the direction and position in which the foot 7 is landed with respect to the edge Se of the stair S which the robot R ascends and descends are recognized. However, when the robot moves on a rough floor, the direction and position in which the foot 7 is landed with respect to a ridge, such as an upper surface of a convex region, of the rough floor may be recognized when the foot is landed on the ridge.

In each of the above embodiments of the present invention, the direction and position in which the foot 7 is landed on a ridge, such as a stair edge Se, which extends substantially laterally with respect to the foot 7 are recognized. However, when the foot 7 is landed on a ridge which extends substantially longitudinally with respect to the foot 7, the direction and position in which the foot 7 is landed with respect to such a ridge may be recognized. In this case, the positions of the floor reactive force center may be determined when the foot is tilted in the longitudinal direction along the ridge, and the direction and position in which the foot 7 is landed with respect to the ridge may be recognized from the data of the determined positions.

While the biped locomotion robot has been described in the above embodiments, the principles of the present invention are also applicable to a robot having more than two movable legs.

In the above embodiments, the six-axis force sensor has been used. However, any of various other sensors may be used insofar as it can detect force components and moments in the embodiments.

In the above embodiments, when the foot 7 is tilted, the movement of the robot R (ascending or descending the stair S) is temporarily stopped. However, when the foot 7 is landed on the edge Se of the stair S, the foot 7 may be tilted to the left and the right while the robot R is continuously moving.

In the above embodiments, the position of the floor reactive force center at the time the foot 7 is tilted is determined only from the output signals of the six-axis force sensor 6. At this time, the position of the floor reactive force center may be determined while raking corrections depending on the tilt angle of the foot 7.

Although certain preferred embodiments of the present invention have been shown and described in detail, it should be understood that various changes and modifications may be made therein without departing from the scope of the appended claims.

What is claimed is:

1. An apparatus for recognizing a landed state of a foot of a legged moving robot having a plurality of movable legs for repeatedly touching and leaving a floor, comprising:

a force sensor mounted on each of the movable legs at a position spaced from a foot sole thereof toward a proximal end thereof, for detecting at least a force and a moment based on a reactive force applied from the floor to the foot when the foot is landed on the floor;

foot tilting means for tilting said foot along a ridge on the floor when said foot is landed on said ridge;

reactive force center recognizing means for recognizing a position of the center of the reactive force applied from the floor to said foot based on the force and the moment detected by said force sensor, in a plurality of tilted attitudes of said foot when said foot is tilted by said foot tilting means; and landed direction/position recognizing means for recognizing a landed direction and/or a landed position of said foot with respect to said ridge based on the position of the center of the reactive force recognized by said reactive force center recognizing means in said plurality of tilted attitudes of said foot.

2. An apparatus according to claim 1, wherein said ridge extends substantially transversely of said foot;

said foot tilting means comprising means for tilting said foot along said ridge into a right-hand tilted attitude in which a right-hand side edge of the foot is held in substantially point-to-point contact with said ridge and a left-hand tilted attitude in which a left-hand side edge of the foot is held in substantially point-to-point contact with said ridge;

said reactive force center recognizing means comprising means for recognizing the position, in a longitudinal direction of said foot, of the center of the reactive force in each of said right-hand tilted attitude and said left-hand tilted attitude of said foot, based on the force and the moment detected by said force sensor; and said landed direction/position recognizing means comprising means for recognizing the landed direction and/or the landed position of said foot with respect to said ridge based on the position, in the longitudinal direction of said foot, of the center of the reactive force recognized by said reactive force center recognizing means in each of said right-hand tilted attitude and said left-hand tilted attitude of said foot.

3. An apparatus according to claim 1, wherein said ridge extends substantially transversely of said foot;

said foot tilting means comprising means for tilting said foot along said ridge at least into a right-hand tilted attitude or a left-hand tilted attitude;

said reactive force center recognizing means comprising means for recognizing the positions, in longitudinal and transverse directions of said foot, of the center of the reactive force in each of said right-hand tilted attitude and said left-hand tilted attitude of said foot, based on the force and the moment detected by said force sensor; and said landed direction/position recognizing means comprising means for recognizing the landed direction and/or the landed position of said foot with respect to said ridge based on the positions, in the longitudinal and transverse directions of said foot, of the center of the reactive force recognized by said reactive force center recognizing means in each of said right-hand tilted attitude and said left-hand tilted attitude of said foot.

4. An apparatus according to claim 1, wherein said ridge extends substantially transversely of said foot;

said foot tilting means comprising means for tilting said foot along said ridge at least to the left or the right;

said reactive force center recognizing means comprising means for recognizing time-series data of the positions, in longitudinal and transverse directions of said foot, of the center of the reactive force in successive tilted attitudes while said foot is being tilted by said foot tilting means, based on the force and the moment detected by said force sensor; and said landed direction/position recognizing means comprising means for determining a function approximating a line of contact between said foot and said ridge when said foot is not tilted, based on the time-series data of the positions, in longitudinal and transverse directions of said foot, of the center of the reactive force recognized by said reactive force center recognizing means, and recognizing the landed direction and/or the landed position of said foot with respect to said ridge based on the determined function.

5. An apparatus according to any one of claims 1, 2, 3, and 4, wherein said force sensor comprises a six-axis force sensor.

6. An apparatus according to claim 2, wherein said landed direction/position recognizing means comprises means for calculating an azimuthal angle of said foot with respect to said ridge based on the position, in the longitudinal direction of said foot, of the center of the reactive force recognized by said reactive force center recognizing means in each of said right-hand tilted attitude and said left-hand tilted attitude of said foot and a distance between the right- and left-hand side edges of said foot, and recognizing the landed direction of said foot with respect to said ridge based on the calculated azimuthal angle.

7. An apparatus according to claim 2, wherein said landed direction/position recognizing means comprises means for calculating a distance, in the longitudinal direction of said foot, from a predetermined reference point on said foot to said ridge based on the position, in the longitudinal direction of said foot, of the center of the reactive force recognized by said reactive force center recognizing means in each of said right-hand tilted attitude and said left-hand tilted attitude of said foot and distances from said reference point to the right- and left-hand side edges of said foot, and recognizing the landed direction of said foot with respect to said ridge based on the calculated distance.

8. An apparatus according to any one of claims 2 through 7, wherein said force detected by said force sensor is exerted in a direction perpendicular to said foot sole, and said moment detected by said force sensor is exerted about a transverse axis extending across said foot sole at a predetermined position thereon.

9. An apparatus according to claim 3, wherein said landed direction/position recognizing means comprises means for calculating an azimuthal angle of said foot with respect to said ridge based on the positions, in the longitudinal and transverse directions of said foot, of the center of the reactive force recognized by said reactive force center recognizing means in each of said right-hand tilted attitude and said left-hand tilted attitude of said foot, and recognizing the landed direction of said foot with respect to said ridge based on the calculated azimuthal angle.

10. An apparatus according to claim 3, wherein said landed direction/position recognizing means comprises means for calculating a distance, in the longitudinal direction of said foot, from a predetermined reference point on said foot to said ridge based on the positions, in the longitudinal and transverse directions of said foot, of the center of the reactive force recognized by said reactive force center recognizing means in each of said right-hand tilted attitude and said left-hand tilted attitude of said foot, and recognizing the landed position of said foot with respect to said ridge based on the calculated distance.

11. An apparatus according to any one of claims 3 through 10, wherein said force detected by said force sensor is exerted in a direction perpendicular to said foot sole, and said moment detected by said force sensor is exerted about a transverse axis extending across said foot sole at a predetermined position thereon.

12. An apparatus according to claim 4, wherein said landed direction/position recognizing means comprises means for determining an azimuthal angle of said foot with respect to said ridge according to said function, and recognizing the landed direction of said foot with respect to said ridge based on the determined azimuthal angle.

13. An apparatus according to claim 4, wherein said landed direction/position recognizing means comprises means for determining a distance, in the longitudinal direction of said foot, from a reference point on said foot to said ridge according to said function, and recognizing the landed position of said foot with respect to said ridge based on the determined distance.

14. An apparatus according to any one of claims 4 through 13, wherein said force detected by said force sensor is exerted in a direction perpendicular to said foot sole, and said moment detected by said force sensor is exerted about transverse and longitudinal axes extending across said foot sole at predetermined positions thereon.

15. An apparatus for determining a landed state of a foot of a legged moving robot having a plurality of movable legs for repeatedly touching and leaving a floor, comprising:

a force sensor mounted on at least one of the movable legs at a proximal end of said leg, for detecting at least one of a force and a moment based on a reactive force applied from the floor to the foot when the foot is landed on the floor;

foot tilting means for tilting said foot along a ridge on the floor when said foot is landed on said ridge;

reactive force center determining means for determining a plurality of positions of the center of the reactive force applied from the floor to said foot based on said at least one of the force and the moment detected by said force sensor, in a plurality of tilted attitudes of said foot when said foot is tilted by said foot tilting means; and landed direction/position determining means for determining at least one of a landed direction and a landed position of said foot with respect to said ridge based on said plurality of positions of the center of the reactive force determined by said reactive force center determining means in said plurality of tilted attitudes of said foot.

16. An apparatus according to claim 15, wherein said ridge extends substantially transversely of said foot;

said foot tilting means comprising means for tilting said foot along said ridge into a right-hand tilted attitude in which a right-hand side edge of the foot is held in substantially point-to-point contact with said ridge and a left-hand tilted attitude in which a left-hand side edge of the foot is held in substantially point-to-point contact with said ridge;

said reactive force center determining means comprising means for determining the position, in a longitudinal direction of said foot, of the center of the reactive force in each of said right-hand titled attitude and said left-hand titled attitude of said foot, based on said at least one of the force and the moment detected by said force sensor; and said landed direction/position determining means comprising means for determining at least one of the landed direction and the landed position of said foot with respect to said ridge based on the position, in the longitudinal direction of said foot, of the center of the reactive force determined by said reactive force center determining means in each of said right-hand titled attitude and said left-hand tilted attitude of said foot.

17. An apparatus according to claim 15, wherein said ridge extends substantially transversely of said foot;

said foot tilting means comprising means for tilting said foot along said ridge into at least one of a right-hand tilted attitude and a left-hand tilted attitude;

said reactive force center determining means comprising means for determining the positions, in longitudinal and transverse directions of said foot, of the center of the reactive forced in the tilted attitude of said foot, based on said at least one of the force and the moment detected by said force sensor; and said landed direction/position determining means comprising means for determining at least one of the landed direction and the landed position of said foot with respect to said ridge based on the positions, in the longitudinal and transverse directions of said foot, of the center of the reactive force determined by said reactive force center determining means in the tilted attitude of said foot.

18. An apparatus according to claim 15, wherein said ridge extends substantially transversely of said foot;

said foot tilting means comprising means for tilting said foot along said ridge to at least one of the left and the right;

said reactive force center determining means comprising means for determining time-series data of the positions, in longitudinal and transverse directions of said foot, of the center of a the reactive force in successive tilted attitudes while said foot is being tilted by said foot tilting means, based on said at least one of the force and the moment detected by said force sensor; and said landed direction/position determining means comprising means for determining a function approximating a line of contact between said foot and said ridge when said foot is not tilted, based on the time-series data of the positions, in longitudinal and transverse directions of said foot, of the center of the reactive force determined by said reactive force center determining means, and determining at least one of the landed direction and the landed position of said foot with respect to said ridge based on the determined function.

19. An apparatus according to claim 16, wherein said landed direction/position determining means comprises means for calculating an azimuthal angle of said foot with respect to said ridge based on the position, in the longitudinal direction of said foot, of the center of the reactive force determined by said reactive force center determining means in each of said right-hand tilted attitude and said left-hand tilted attitude of said foot and a distance between the right- and left-hand side edges of said foot, and determining the landed direction of said foot with respect to said ridge based on the calculated azimuthal angle.

20. An apparatus according to claim 16, wherein said landed direction/position determining means comprises means for calculating a distance, in the longitudinal direction of said foot, from a predetermined reference point on said foot to said ridge based on the position, in the longitudinal direction of said foot, of the center of the reactive force determined by said reactive force center determining means in each of said right-hand tilted attitude and said left-hand tilted attitude of said foot and distances from said reference point to the right- and left-hand side edges of said foot, and determining the landed direction of said foot with respect to said ridge based on the calculated distance.

21. An apparatus according to any one of claims 16 through 20, wherein said force detected by said force sensor is exerted in a direction perpendicular to said foot sole, and said moment detected by said force sensor is exerted about a transverse axis extending across said foot sole at a predetermined position thereon.

22. An apparatus according to claim 17, wherein said landed direction/position determining means comprises means for calculating an azimuthal angle of said foot with respect to said ridge based on the positions, in the longitudinal and transverse directions of said foot, of the center of the reactive force determined by said reactive force center determining means in the tilted attitude of said foot, and determining the landed direction of said foot with respect to said ridge based on the calculated azimuthal angle.

23. An apparatus according to claim 17, wherein said landed direction/position determining means comprises means for calculating a distance, in the longitudinal direction of said foot, from a predetermined reference point on said foot to said ridge based on the positions, in the longitudinal and transverse directions of said foot, of the center of the reactive force determined by said reactive force center determining means in the tilted attitude of said foot, and determining the landed position of said foot with respect to said ridge based on the calculated distance.

24. An apparatus according to any one of claims 17 through 23, wherein said force detected by said force sensor is exerted in a direction perpendicular to said foot sole, and said moment detected by said force sensor is exerted about a transverse axis extending across said foot sole at a predetermined position thereon.

25. An apparatus according to claim 18, wherein said landed direction/position determining means comprises means for determining an azimuthal angle of said foot with respect to said ridge according to said function, and recognizing the landed direction of said foot with respect to said ridge based on the determined azimuthal angle.

26. An apparatus according to claim 18, wherein said landed direction/position determining means comprises means for determining a distance, in the longitudinal direction of said foot, from a reference point on said foot to said ridge according to said function, and determining the landed position of said foot with respect to said ridge based on the determined distance.

27. An apparatus according to any one of claims 18, through 26, wherein said force detected by said force sensor is exerted in a direction perpendicular to said foot sole, and said moment detected by said force sensor is exerted about transverse and longitudinal axes extending across said foot sole at predetermined positions thereon.

28. An apparatus according to any one of claims 15, 16, 17 and 18, wherein said force sensor comprises a six-axis force sensor.

29. A method for determining a landed state of a foot of a legged moving robot having a plurality of movable legs for repeatedly touching and leaving a floor, comprising the steps of:

detecting at least one of a force and a moment applied to the foot based on a reactive force applied from the floor to the foot when the foot is landed on the floor;

tilting said foot along a ridge on the floor when said foot is landed on the ridge;

determining a plurality of positions of the center of the reactive force applied from the floor to said foot based on said at least one of the force and moment detected in a plurality of tilted attitudes of said foot when said foot is tilted; and determining at least one of a landed direction and a landed position of said foot with respect to the ridge based on said plurality positions of the center of the reactive force in said plurality of tilted attitudes of said foot.

30. The method according to claim 29, wherein the ridge extends substantially transversely of said foot;

said foot tilting step including tilting said foot along the ridge into a right-hand tilted attitude in which a right-hand side edge of the foot is held in substantially point-to-point contact with the ridge and a left-hand tilted attitude in which a left-hand side edge of the foot is held in substantially point-to-point contact with the ridge;

said reactive force center determining step includes determining the position, in a longitudinal direction of said foot, of the center of the reactive force in each of said right-hand tilted attitude and said left-hand tilted attitude of said foot, based on said at least one of the force and the moment; and said landed direction/position determining step including determining the landed direction and/or the landed position of said foot with respect to the ridge based on the position, in the longitudinal direction of said foot, of the center of the reactive force determined in said reactive force center determining step in each of said right-hand tilted attitude and said left-hand tilted attitude of said foot.

31. The method according to claim 29, wherein the ridge extends substantially transversely of said foot;

said foot tilting step including tilting said foot along the ridge into at least one of a right-hand tilted attitude or a left-hand tilted attitude;

said reactive force center determining step including determining the positions, in longitudinal and transverse directions of said foot, of the center of the reactive force in each of said right-hand tilted attitude and said left-hand tilted attitude of said foot, based on said at least one of the force and the moment detected in said detecting step; and said landed direction/position determining step including determining at lest one of the landed direction and the landed position of said foot with respect to the ridge based on the positions, in the longitudinal and transverse directions of said foot, of the center of the reactive force determined in said reactive force center determining step in each of said right-hand titled attitude and said left-hand titled attitude of said foot.

32. The method according to claim 29, wherein the ridge extends substantially transversely of said foot;

said foot tilting step including tilting said foot along the ridge to at least one of the left or the right;

said reactive force center determining step including determining time-series data of the positions, in longitudinal and transverse directions of said foot, of the center of the reactive force in successive tilted attitudes while said foot is being tilted, based on at least one of the force and the moment detected in said detecting step; and said landed direction/position determining step includes determining a function approximating a line of contact between said foot and the ridge when said foot is not tilted, based on the time-series data of the positions, in longitudinal and transverse directions of said foot, of the center of the reactive force determined by said reactive force center determining step, and determining at least one of the landed direction and the landed position of said foot with respect to the ridge based on the determined function.

33. The method according to claim 30, wherein said landed direction/position determining step includes calculating an azimuthal angle of said foot with respect to the ridge based on the position, in the longitudinal direction of said foot, of the center of the reactive force determined in said reactive force center determining step in each of said right-hand titled attitude and said left-hand tilted attitude of said foot and a distance between the right- and left-hand side edges of said foot, and determining the landed direction of said foot with respect to the ridge based on the calculated azimuthal angle.

34. The method according to claim 30, wherein said landed direction/position determining step includes calculating a distance, in the longitudinal direction of said foot, from a predetermined reference point on said foot to the ridge based on the position, in the longitudinal direction of said foot, of the center of the reactive force determined in said reactive force center determining step in each of said right-hand tilted attitude and said left-hand tilted attitude of said foot and distances from said reference point to the right- and left-hand side edges of said foot, and determining the landed direction of said foot with respect to the ridge based on the calculated distance.

35. The method according to any one of claims 30 through 34, wherein said force detected in said detecting step is exerted in a direction perpendicular to a sole of said foot, and said moment detected in said detecting step is exerted about a transverse axis extending across said foot sole at a predetermined position thereon.

36. The method according to claim 31, wherein said landed direction/position determining step includes calculating an azimuthal angle of said foot with respect to the ridge based on the positions, in the longitudinal and transverse directions of said foot, of the center of the reactive force determined in said reactive force center determining step in each of said right-hand tilted attitude and said left-hand titled attitude of said foot, and determining the landed direction of said foot with respect to said ridge based on the calculated azimuthal angle.

37. The method according to claim 31, wherein said landed direction/position determining step includes calculating a distance, in the longitudinal direction of said foot, from a predetermined reference point on said foot to the ridge based on the positions, in the longitudinal and transverse directions of said foot, of the center of the reactive force determined in said reactive force center determining step in each of said right-hand tilted attitude and said left-hand tilted attitude of said foot, and determining the landed position of said foot with respect to the ridge based on the calculated distance.

38. The method according to any one of claims 31 through 37, wherein said force detected in said detecting step is exerted in a direction perpendicular to a sole of said foot, and said moment detected in said detecting step is exerted about a transverse axis extending across said foot sole at a predetermined position thereon.

39. The method according to claim 32, wherein said landed direction/position determining step includes determining an azimuthal angle of said foot with respect to the ridge according to said function, and determining the landed direction of said foot with respect to the ridge based on the determined azimuthal angle.

40. The method according to claim 32, wherein said landed direction/position determining step includes determining a distance, in the longitudinal direction of said foot, from a reference point on said foot to the ridge according to said function, and determining the landed position of said foot with respect to the ridge based on the determined distance.

41. The method according to any one of claims 32 through 40, wherein said force detected in said detecting step is exerted in a direction perpendicular to a sole of said foot, and said moment detected in said detecting step is exerted about transverse and longitudinal axes extending across said foot sole at predetermined positions thereon.

42. The method according to any one of claims 29, 30, 31, and 32, wherein said detecting step includes detecting forces in six-axes.

* * * * *